(12) United States Patent
Kenyon et al.

(10) Patent No.: US 6,508,328 B1
(45) Date of Patent: Jan. 21, 2003

(54) ALL WHEEL DRIVE FOR MOTOR GRADES

(75) Inventors: David John Kenyon; Mark Wayne Glassford, both of Goderich (CA)

(73) Assignee: Champion Road Machinery Limited, Goderich (CA)

( * ) Notice: Subject to any disclaimer, the term of this patent is extended or adjusted under 35 U.S.C. 154(b) by 0 days.

(21) Appl. No.: 09/575,228

(22) Filed: May 22, 2000

(51) Int. Cl.⁷ .............................................. B60K 17/14
(52) U.S. Cl. ........................................ 180/308; 180/305
(58) Field of Search ........................... 180/305, 307, 180/308

(56) References Cited

U.S. PATENT DOCUMENTS

| | | | | |
|---|---|---|---|---|
| 3,865,207 A | * | 2/1975 | Schwab et al. ............ | 180/44 F |
| 3,978,937 A | * | 9/1976 | Chichester et al. ......... | 180/305 |
| 4,102,425 A | * | 7/1978 | Marsden et al. ............ | 180/305 |
| 4,140,196 A | * | 2/1979 | Brewer ....................... | 180/305 |
| 4,341,280 A | * | 7/1982 | Dezelan ...................... | 180/243 |
| 4,368,798 A | * | 1/1983 | Meyerle et al. ............. | 180/307 |
| 4,402,181 A | * | 9/1983 | Acker et al. ................ | 180/305 |
| 4,518,053 A | * | 5/1985 | Queveau .................... | 180/14.2 |
| 4,554,991 A | * | 11/1985 | Eden .......................... | 180/243 |
| 5,101,925 A | * | 4/1992 | Walker ....................... | 180/243 |
| 5,117,936 A | * | 6/1992 | Nakamura et al. .......... | 180/242 |
| 5,148,885 A | * | 9/1992 | Weyer ........................ | 180/253 |
| 5,489,007 A | * | 2/1996 | Yesel ......................... | 180/243 |
| 5,540,299 A | * | 7/1996 | Tohda et al. ................ | 180/243 |
| 5,848,664 A | * | 12/1998 | Kaspar ....................... | 18/308 |
| 5,873,427 A | * | 2/1999 | Ferguson et al. ........... | 180/178 |
| 5,957,235 A | * | 9/1999 | Nishimura .................. | 180/306 |
| 6,109,384 A | * | 8/2000 | Bromley et al. ............ | 180/242 |

* cited by examiner

*Primary Examiner*—Frank Vanaman
*Assistant Examiner*—L. Lum

(57) ABSTRACT

A full hydrostatic transmission is used as part of an all wheel drive system of a motorgrader. Each front wheel includes its own drive system comprising a pump, a hydraulic motor and a bypass valve. The bypass valve protects the motor automatically from cavitation conditions and allows the hydrostatic transmission avoid hydrostatic braking.

19 Claims, 26 Drawing Sheets

AWD Hydraulic Schematic

2) Machine driving forward with the AWD "ON"
 - Fwd Bypass Solenoid LH (DCV3) is energized and shifted
 - Rev Bypass Solenoid LH (DCV4) is de-energized
 - The bypass valve will be closed and oil flow will be directed to the motor 3) Grader is driving forward and the operator actuates the clutch or brake:

- Fwd Bypass Solenoid LH (DCV3) is de-energized
- Rev Bypass Solenoid LH (DCV4) remains de-energized
- The Bypass valve is shifted to the "bypass", position

Figure 14

4) Grader is driving forward and the operator makes a right turn :

- Fwd Bypass Solenoid LH (DCV3) is energized
- Rev Bypass Solenoid LH (DCV4) remains de-energized
- Left wheel is driven faster by the grader - the flow rate of oil supplied by the pump does not increase as wheel speed increases - drive pressure drops off ( eventually to charge pressure) - Oil flow "returning from the motor increases as motor speed increases - this increases " braking " pressure. - the bypass valve will open once " braking " pressure is higher than the bypass valve " spring " pressure.

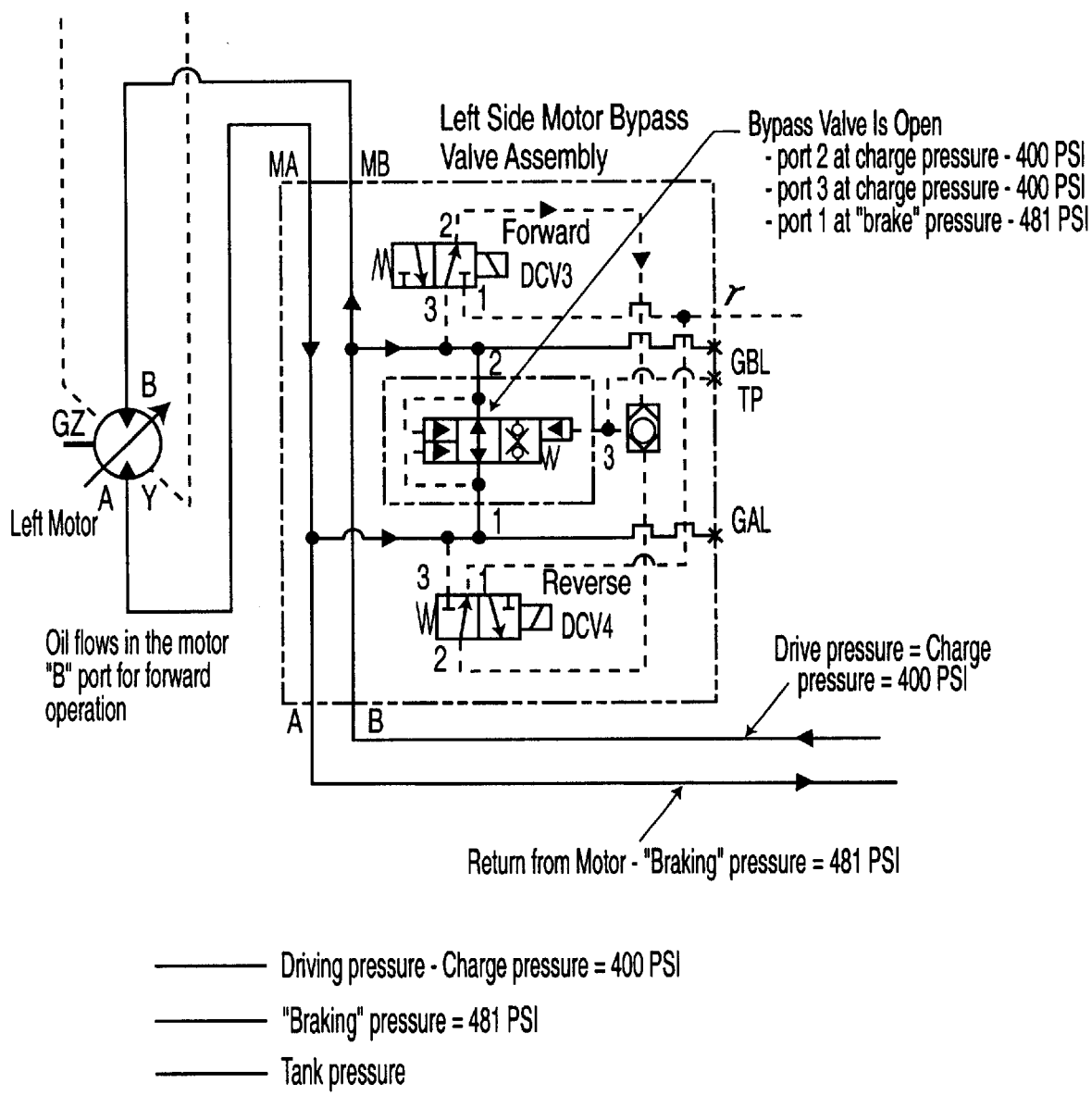

OVERALL AWD LOGIC FLOW CHART

CHART # 1 CALIBRATION MODE

ALL WHEEL DRIVE FOR MOTOR GRADES

BACKGROUND OF THE INVENTION

The present invention relates to drive control arrangements for motor graders and in particular, relates to an all wheel drive arrangement for motor graders and other vehicles.

All wheel drive arrangements for motor graders have the advantage that the front drive wheels can compensate for poor traction conditions experienced by the tandem drive. The front wheel drive can operate in a passive mode where the front wheels only form part of the primary drive when there is slippage of the tandem drive. This passive mode basically allows the front wheel drive to respond when slippage has occurred on the tandem drive while in good traction conditions, the grader acts as if it is only driven by the tandem drive.

All wheel drive systems allow a variation in the level of aggression of the front wheel drive and the front wheel drive can be set to be faster than the tandem drive. This aggressive mode is not the most cost efficient manner of operating the grader but it is desirable for certain applications.

Existing front wheel drive arrangements for motor graders use a hydraulic motor which is supplied with hydraulic fluid under pressure for providing the necessary drive of the front wheels. There is a common hydraulic pump that supplies hydraulic fluid to each of the hydraulic motors and a flow control valve distributes the amount of hydraulic fluid to each motor. Control between the two motors is based on control of the distributing valve. Various sensors are used for sensing the speed of the front wheels, rear wheels, ground speed and other parameters which sensors are connected to a controller which controls the speed of the pump as well as the position of the distribution valve. With this arrangement, fine adjustment between the drive of the front wheels is difficult to achieve.

The present invention in a preferred embodiment uses a different drive arrangement where each front wheel has its own hydraulic circuit and is hydraulically separated from the hydraulic circuit of the other drive. This drive arrangement provides increased control and sensitivity in adjustment of the system.

In a further embodiment a bypass valve is used to control the switching of the hydraulic circuit across the motor from an open circuit to a closed circuit. This by-pass valve automatically adjusts to changing conditions and appropriately switches the conditions of the drive arrangement.

The present invention allows an all wheel drive which additional works in a creep mode where only the front wheels are driven.

The particular drive arrangement for each front wheel drive allows simplified control logic due to the automatic response of the by-pass valve to changing hydraulic conditions as opposed to electrically driving such a by-pass valve to respond to changing conditions. The particular hydraulic circuit automatically responds to the changing conditions and causes the hydraulic circuit to appropriately respond.

BRIEF DESCRIPTION OF THE DRAWINGS

Preferred embodiments of the invention are shown in the drawings, wherein:

FIGS. 10 through 14 show various conditions of the bypass valve;

DETAILED DESCRIPTION OF THE PREFERRED EMBODIMENTS

Figure 1:
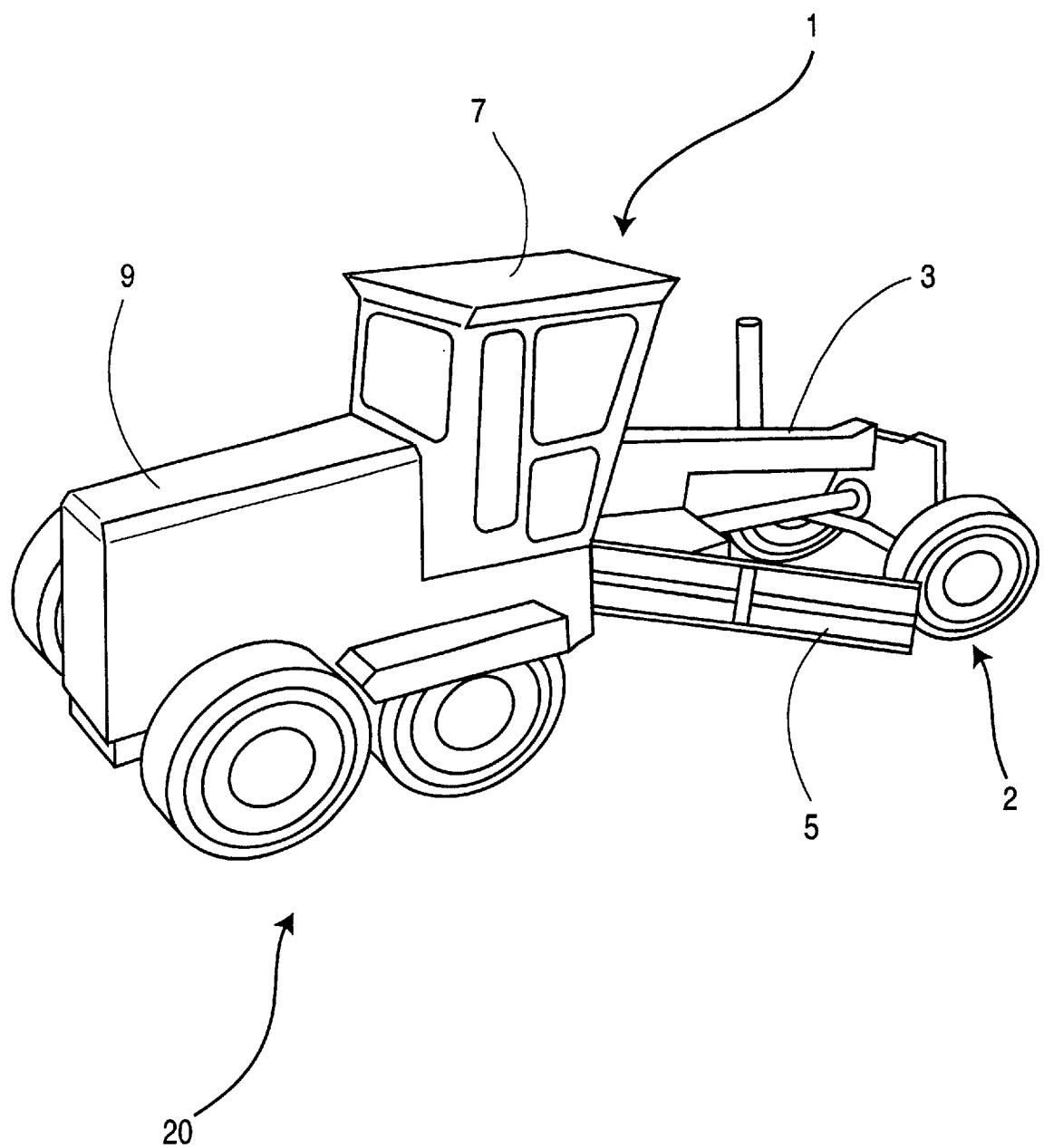
FIG. 1 is a perspective view of a motor grader.

FIG. 1 schematically illustrates a motor grader 1 having a frame 3, an operator's cab 7, and a motor 9 which drives a tandem drive 20. The grader has a mold board 5 suspended beneath the frame and includes front wheel drive arrangements to either side of the grader.

Figure 2:
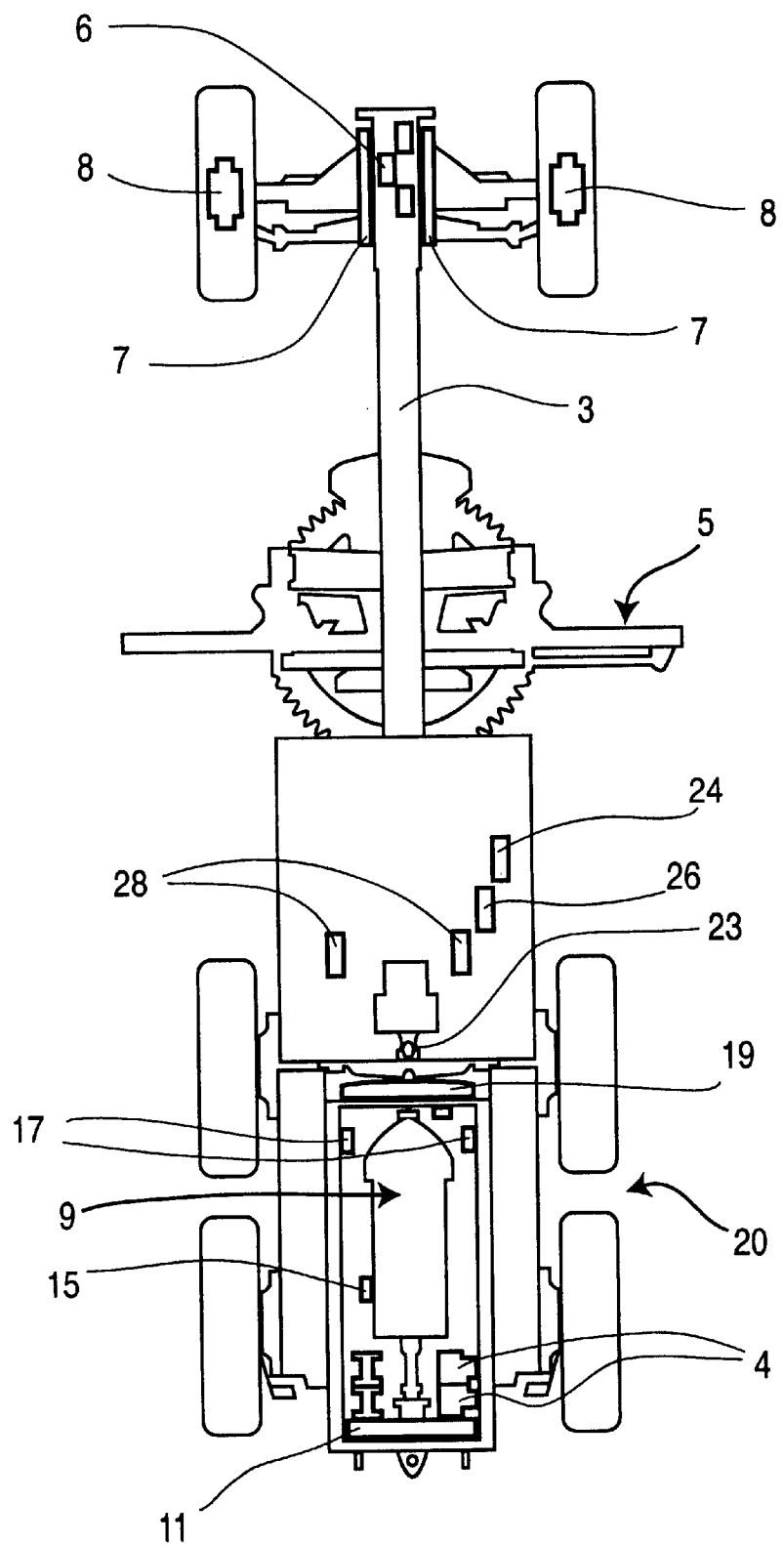
FIG. 2 is a top view of a motor grader showing the tandem and front wheel drives and various sensors.

The top view of the motor grader as illustrated in FIG. 2 has additional components used to control the all wheel drive arrangement of the grader. Each front wheel drive system 2 includes a variable output pump 4, a hydraulic motor 8, which is preferably driven by a variable output pump 4. The motor drives the front wheels of the grader. The drive system also includes a condition sensing by-pass valve 6 associated with the hydraulic motor 8. Brake and clutch sensing mechanism 28 is shown as well as the all wheel drive control panel 24 and the transmission control all wheel drive control module 26.

Figure 3:
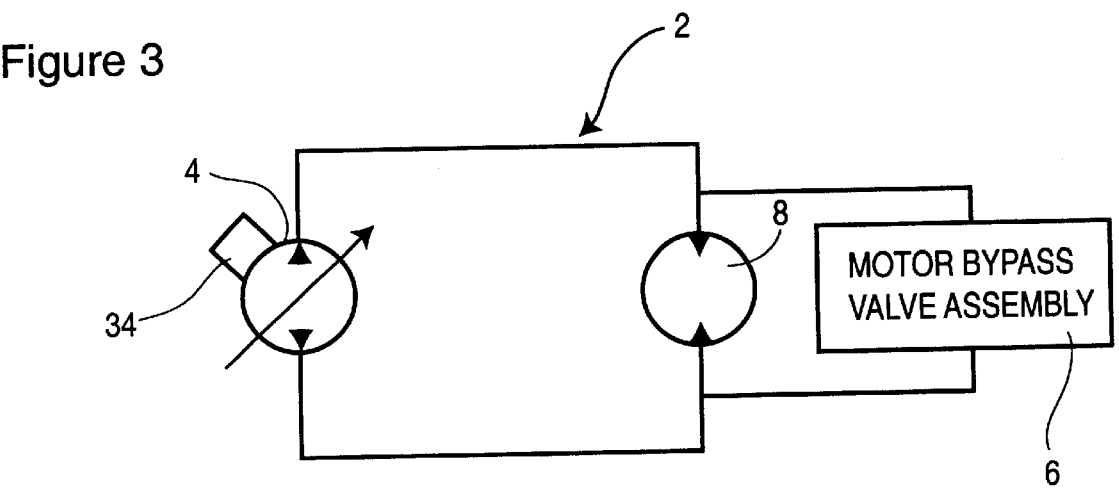
FIG. 3 is a simplified schematic view of the hydraulic circuit of one of the front wheel drives.

Each of the front wheel drive systems 2 include their own accumulating tanks 7 for excess hydraulic fluid. The grader frame is articulated generally about a point 23 in front of the motor 9. The front wheel drive system 2 is preferably duplicated to either side of the motor grader. Each drive system works independently and one such drive system is schematically shown in FIG. 3. The variable output pump 4 is connected to the hydraulic motor 8 and the automatic condition sensing bypass valve 6 is in parallel with the motor. The pump 4 and the hydraulic motor 8 is shown in greater detail in FIGS. 5 and 6 respectively.

The controller 34 of the pump receives a current input signal and based on the current, provides adjustment of the output of the pump. The pump is by-directional and therefore allows the motor to operate in either a forward or reverse direction. The pump can also be in a neutral position where it does not pump any hydraulic fluid. The hydraulic motor 8 has an operating position where the pistons of the motor are connected to an output drive member and a free wheel position where the pistons are separated from the drive member. In this free wheel position, the pistons of the motor are biased to a clear position and the motor can free wheel.

The automatic sensing bypass valve 6 is either open or closed. In the closed position, the motor is driven by the pump as a typical hydrostatic drive, whereas in the open position, hydraulic fluid discharged by the motor is returnable through the bypass valve to the inlet side of the motor. This arrangement avoids hydrostatic braking and also avoids cavitation when the motor is overdriven by the front wheel.

Figure 4:
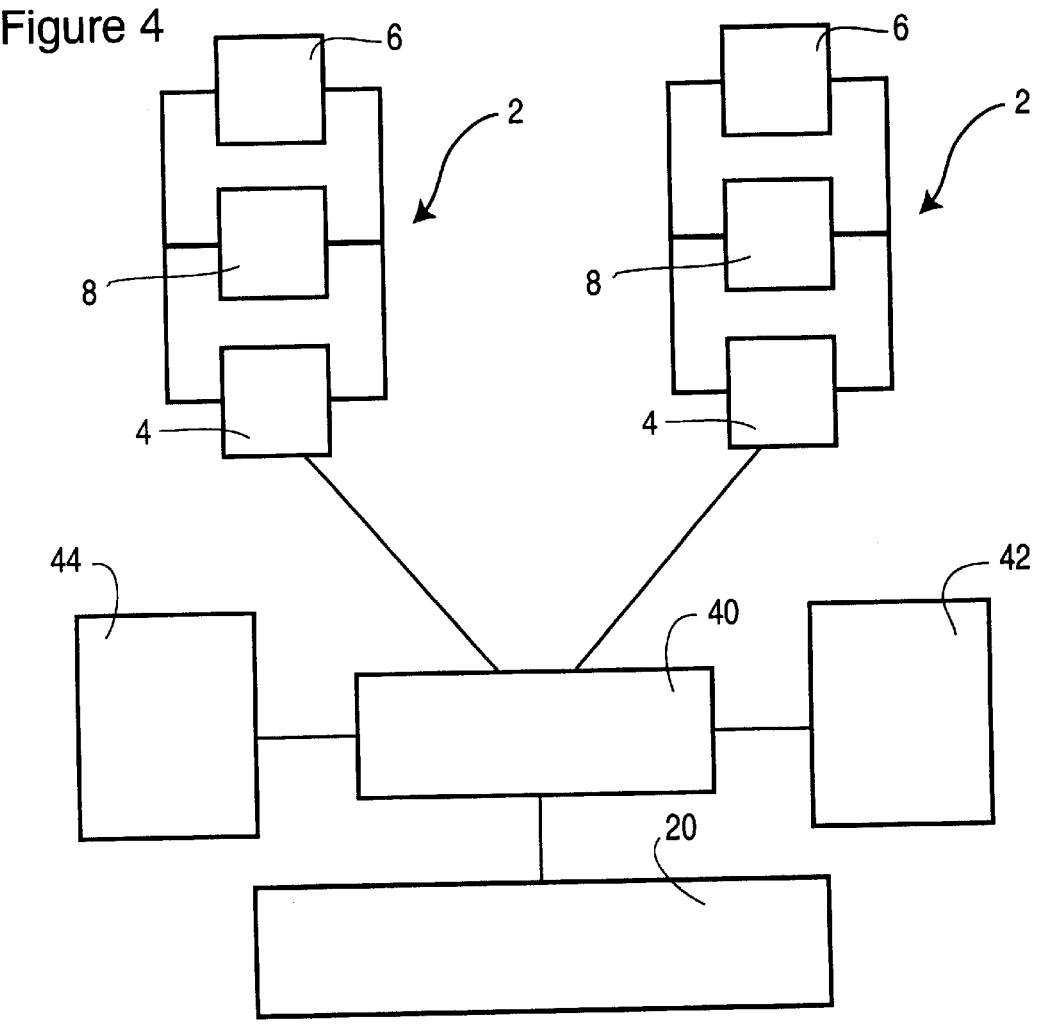
FIG. 4 is a schematic view showing the tandem drive and two separate drives for the front wheel of the grader and a control arrangement.

As shown in FIG. 4, the all wheel drive arrangement of the motor grader has two separate front wheel drive systems 2 which as shown, work independently of one another hydraulically, yet are controlled by the controller 40. The controller 40 effectively coordinates the front wheel drive systems with the tandem drive system of the grader. The controller receives a number of inputs including inputs from the sensors generally shown as 42 and from the operator controller 44. The coordination of the drive arrangement between the front wheel drive system and the tandem drive system is simplified due to the automatic condition sensing by-pass valves 6. In addition if steering angle and/or articulation angle are sensed, each pump can be adjusted to provide appropriate aggressive front wheel drive during cornering.

These bypass valves cause the hydraulic circuit of each motor 8 to assume a bypass condition when the front wheels are being driven by the pump at a lesser rate than necessary to keep up with the drive of the wheels of the tandem drive arrangement 20. This is often referred to as a passive mode for the front wheel drive. Basically the front wheels are being driven by each pump 4, however, the front wheels are overdriving the motors 8 to keep up with the movement caused by the tandem drive arrangement.

This can produce a motor cavitation condition that is corrected by the bypass valve. The automatic condition sensing by-pass valves 6 produce an open circuit across each motor and thus protect the motors 8. Basically the motor can overrun as if connected to an overrunning clutch, however, this function is accomplished hydraulically. In the event that the tandem drive wheels start to slip, due to a loss of traction, the overdrive condition of the front wheels will cease and the automatic condition sensing by-pass valves 6 close due to an increase in pressure caused by the fact that the motors are no longer functioning as a pump. This increase in pressure is sensed by the bypass valves and closes the bypass valves. The front wheels are then driven by the respective motors and the front wheels become the dominant traction component of the grader until such time as the tandem wheels cease to experience the slip condition. The bypass valves 6 sense these conditions hydraulically and as the pump is being operated as if it was driving the front wheel, it immediately has the necessary flow of hydraulic fluid to drive the respective motor and the closing of the bypass valve forces the hydraulic fluid from the pump too power the hydraulic motor. Thus the system rapidly switches from passive to aggressive front wheel drive while the drive system is a full hydrostatic system. The slowing of the grader, due to slippage of the tandem drive, causes the motor to cease acting as a pump, allowing the drive pressure to the motor to increase and close the bypass valve.

When the machine is moving and the front wheels are being overdriven (i.e. low aggression setting) the motors are rotating faster (or require more oil) than the oil flow being supplied by the pump. Therefore, pump flow is not being "restricted" drive pressure will not result. The motor is acting as pump, and as a result, there will be some "hydrostatis braking pressure". The amount of backpressure, or the difference between the inlet and outlet, pressure of the motor will be equal the spring setting of the by-pass valve (or logic element).

Overrunning in forward. Drive pressure will drop to charge pressure (approximately 400 PSI)

Area A2 (motor in) will see charge pressure (400 PSI)

Area A3 (motor in) will see charge pressure (400 PSI)

Area A2 (motor out) will build up 400+spring=480 PSI

The valve will shift to the open position

When the rear wheels slip, the whole machine slows down and the front wheels slow down. The pump continues to supply the same amount of oil. When the machine (and wheels) slow to a rate that is less than the flow rate supplied by the pump, pump flow will be restricted and drive pressure increase. The bypass valve will close and the motors will be positively driven.

Area A2 (motor in) will see drive pressure (assume 1000 PSI)

Area A3 (motor in) will see drive pressure (assume 1000 PSI)

Area A1 (motor out) will see charge pressure (400 PSI)

The valve will close.

The all wheel drive system is also capable of being driven in an aggressive mode where the front wheels are over driven relative to the tandem drive. In this condition, which is a setting inputted by the operator using controller 44, the bypass valves are closed and the front drive wheels are active. Basically each pump is driven to produce a pressure that closes the bypass valve as the motor now drives the front wheel as opposed to be driven by the front wheel. The bypass valves still function to help protect the hydraulic motors 8 even in the aggressive mode. For example, when the grader is being turned and the motor speeds are such that one motor is overdriven. This condition is sensed by the by-pass valve and again, it operates to protect the motor from cavitation.

Figure 5:
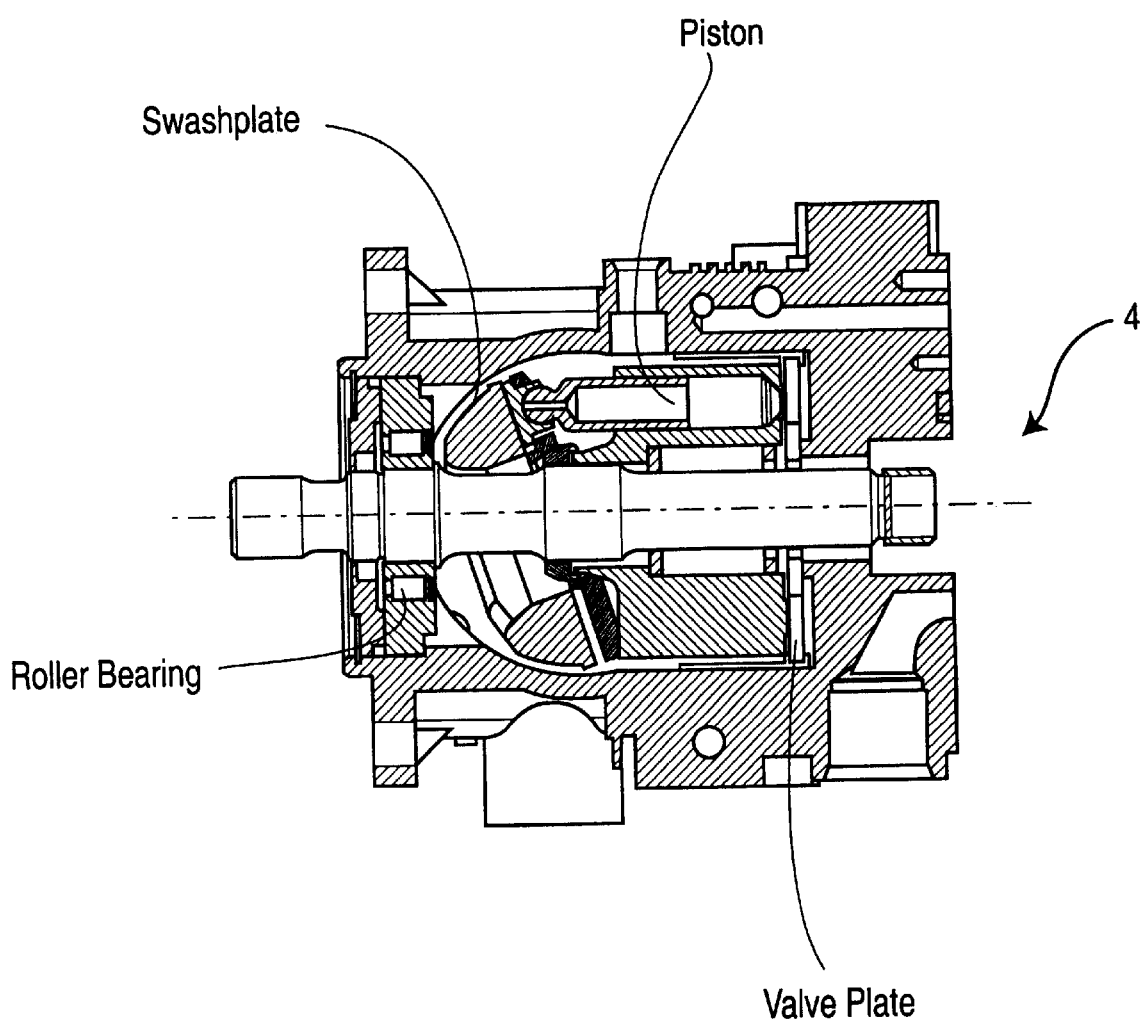
FIG. 5 is a sectional view of a variable displacement pump.

FIG. 5 shows a cross section of the variable output pump of which is an axial piston pump of the type manufactured by Sauer-Sundstrand. The pump includes a barrel and piston rotation arrangement where the pistons slide on a swashplate. The swashplate is adjustable by varying the angle of the swashplate to vary the displacement of the pump. An electric displacement control unit 34 varies the position of the swashplate. This allows the output of the pump to be tailored to the needs of that particular front wheel.

Figure 6:
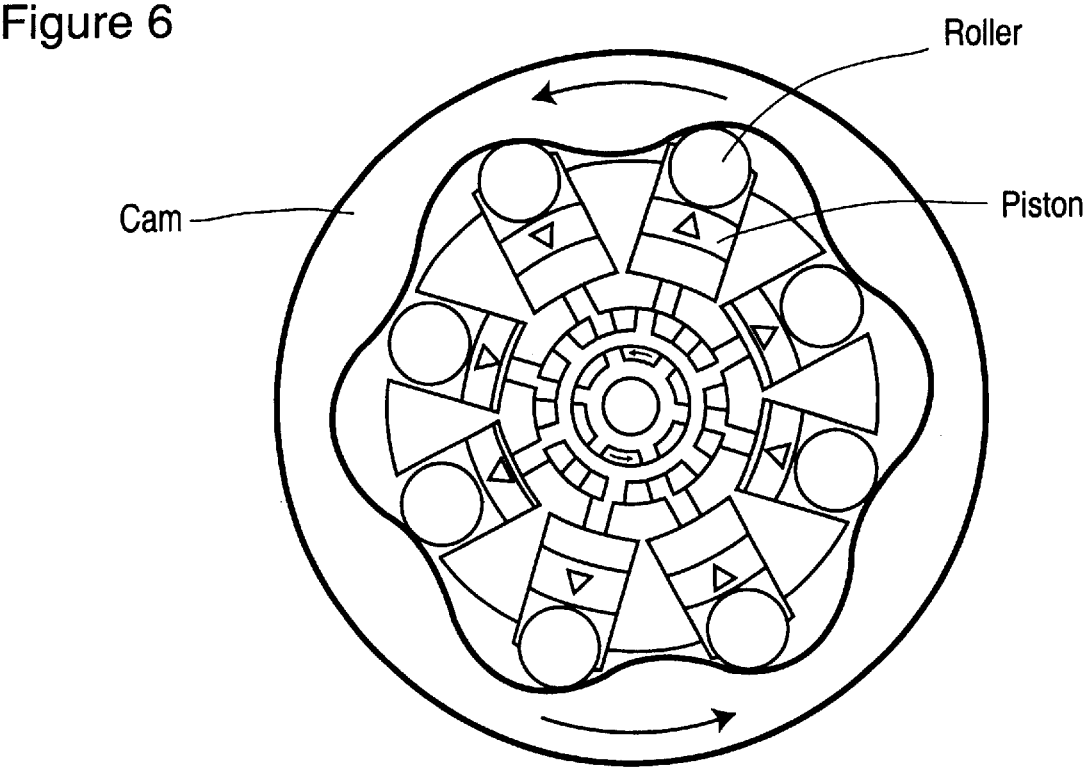
FIGS. 6 and 7 are schematic views of a particular hydraulic motor for the front wheels.
Figure 7:
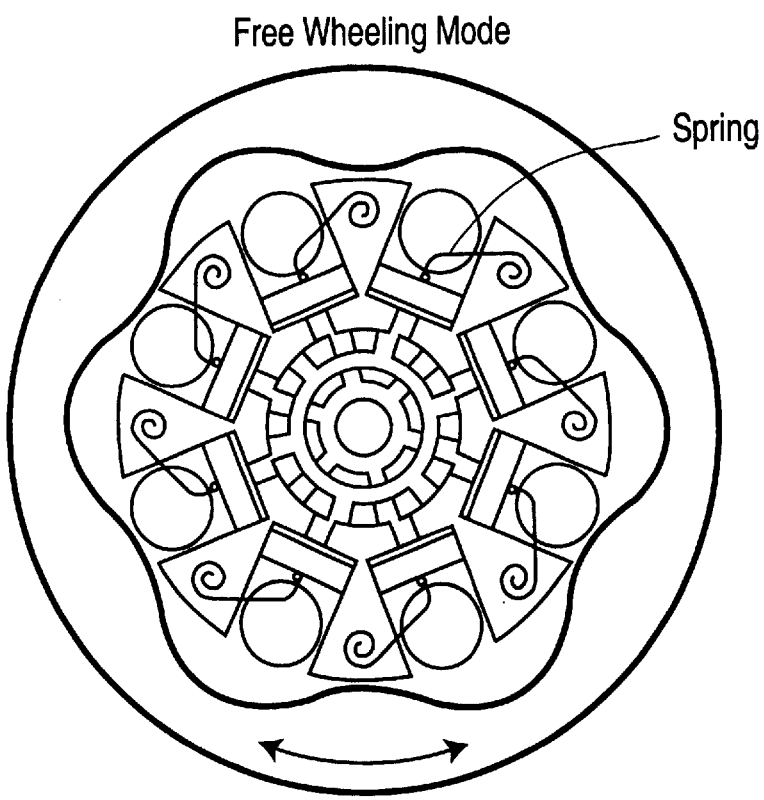

FIGS. 6 and 7 illustrate a radial piston pump of the type manufactured by Valmet Hydraulics. FIG. 7 shows the hydraulic motor schematically in closed hydraulic circuit condition. This is a low speed high torque radial piston cam/lobe type motor. Oil ported to the pistons force the pistons against the cam, forcing the cam to rotate. The motor housing and wheel rotate with the cam.

FIG. 7 shows the motor in a free wheeling mode where the pistons are not in contact with the cam. The cam housing and wheel rotate freely. This is the condition when the front wheel drive is off. The hydraulic oil which is normally in contact with the pistons that drive the pistons has been drained and is essentially not acting on the pistons. Spring arrangements and hydraulic pressure can be used to drive the pistons to the non contacting position of FIG. 7.

The bypass valve 6 automatically senses a cavitation condition of the motor (overdrive condition) and opens the bypass valve to feed additional hydraulic fluid to the inlet of the motor. During actual braking or clutching the bypass valve is opened (by movement of the solenoids) such that hydrostatic braking is avoided.

The front wheel drive systems define a full hydrostatic drive that operates in a passive or aggressive mode and is actually driven in these modes to be available if slippage of tandem drive occurs and the front systems are in passive mode. In such a condition the motors of the front systems prior to slippage are driven by the respective motors and additional fluid is provided by the bypass valves to avoid cavitation. Slippage of the tandem drive results in a change in hydraulic pressures and closing of the bypass valves resulting in front wheel drive. The pumps are always pumping and the pistons of the motor are in contact with theses drive components. Therefore, the transition is accomplished smoothly and quickly.

Hydrostatic braking is avoided by opening the bypass valve whereby normal braking using the tandem braking continues. This opening of the bypass occurs automatically as the front wheels are driving the motor and this hydraulic condition opens the bypass valve. This occurs due to the motor being overdriven. The operator depressing the brake or clutch changes a solenoid valve which changes the hydraulic conditions acting on the bypass valve and moves it to a bypass position if not already there. A further advantage of the front wheel drive system is the protection of the hydraulic motors. The bypass valve automatically senses cavitation conditions and opens to supply the necessary additional fluid while continuing to be driven A full hydrostatic front wheel drive system is used which recognizes that pump adjustment to compensate for many changing conditions is impractical. The bypass valve provides an automatic clutch like function, provides a differential function for cornering, provides cavitation protection, provides passive and aggressive modes in a full hydrostatic drive, allows the systems to avoid hydrostatic braking, and maintains the pump and motor in a full function condition for fast return to an aggressive drive condition. The bypass valve also allows greater flexibility in changing drive settings on the fly.

In creep mode the bypass valve is preferably closed by adjustment of the solenoids such that a full hydrostatic drive with hydrostatic braking is provided. The operator uses the throttle position to accelerate or decelerate. The tandem braking system remains active and can open the bypass valve when actuated. This allows normal braking of the grader to occur.

Figure 8:
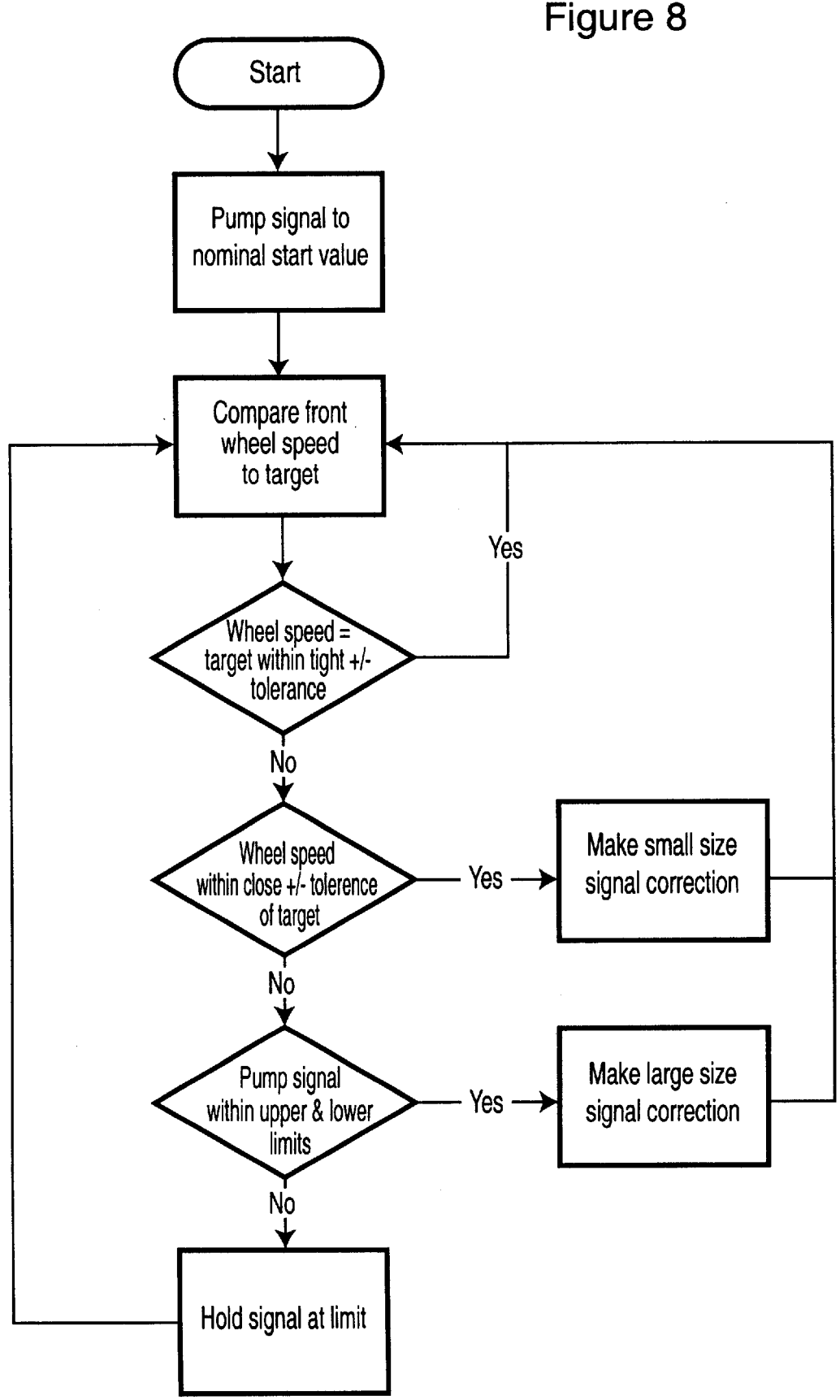
FIG. 8 is a control logic chart for the all wheel drive controller.

FIG. 8 shows details of the control logic used for the all wheel drive arrangement. Each of the pumps are initially driven to a nominal start value to provide hydraulic fluid to the motors. Input is received regarding the desired front wheel target speed and a comparison is made between the actual front wheel speed of each drive wheel system and its own target. If the wheel speed is within a very tight tolerance, the process is repeated. If the wheel speed is outside this close tolerance and is within a somewhat less demanding tolerance, then a decision is made to produce a small size signal correction which is fed to the controller of the pump.

If the wheel speed is well is outside this close tolerance, a further decision is made whether the pump signal is within upper and lower limits, and if it is within the upper and lower limits which define normal operating ranges then a large signal correction is made. In contrast, if the pump is either the upper or lower limit then a decision is made to hold the signal at the limit. In this way, upper and lower limits are set for each pump and different incremental adjustments are made to the pump signal in accordance with the condition sensed. With this system, the hydraulic motors are always ready to provide drive. The lower limit of the pump keeps the output at a value where power can be provided quickly when necessary.

Figure 9A:
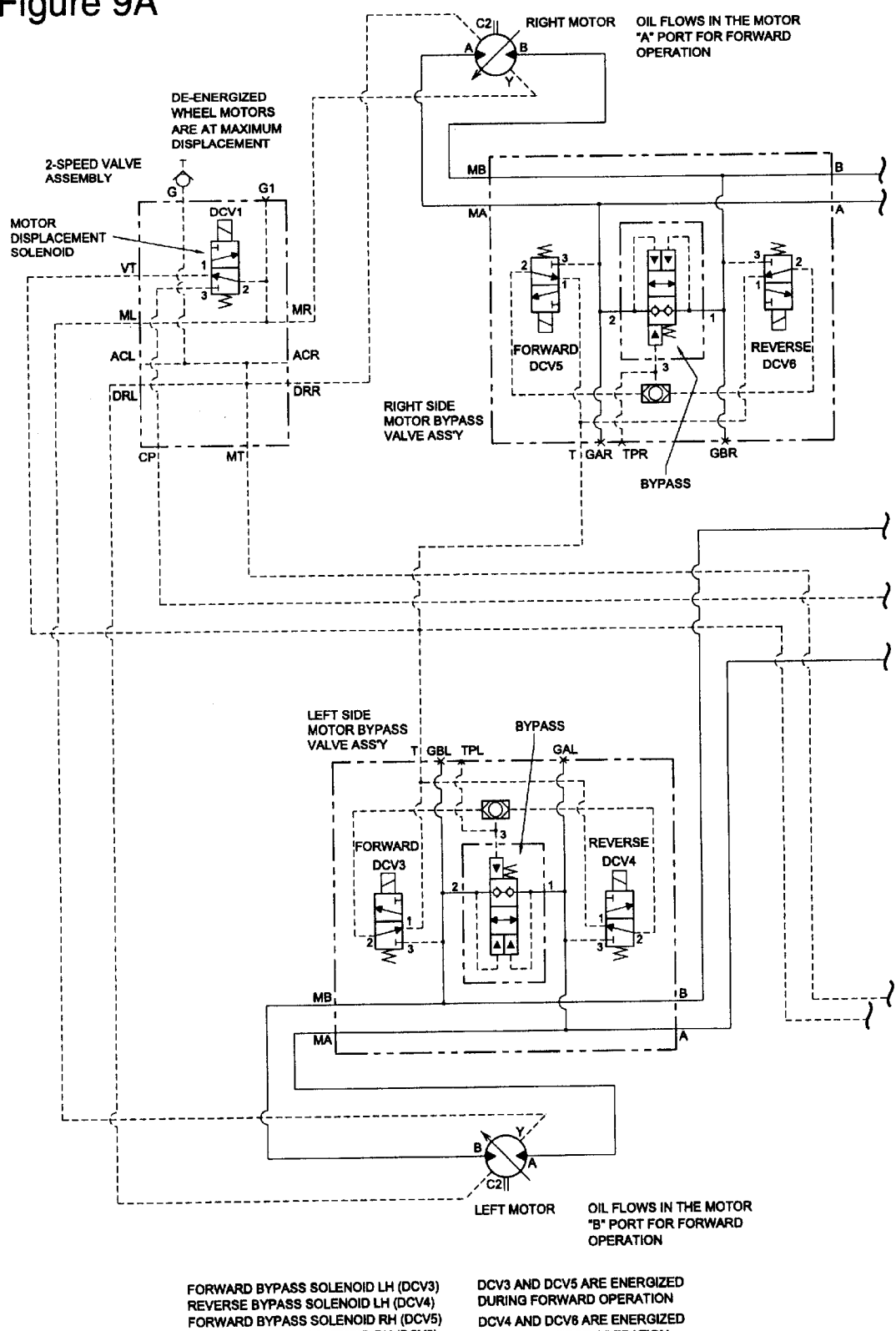
FIG. 9 shows details of the hydraulic circuit of the two front wheel drive systems.
Figure 9B:
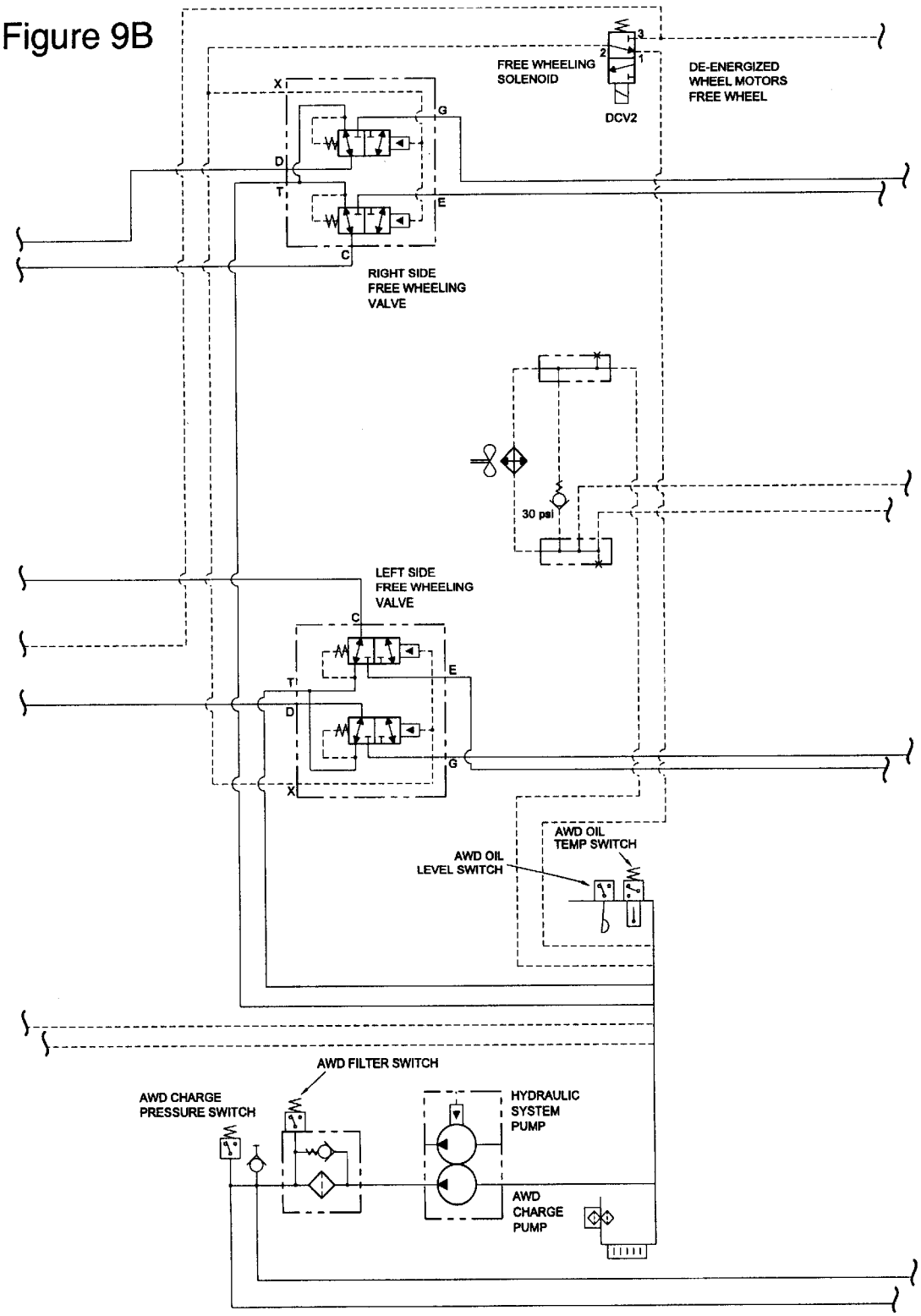
Figure 9C:
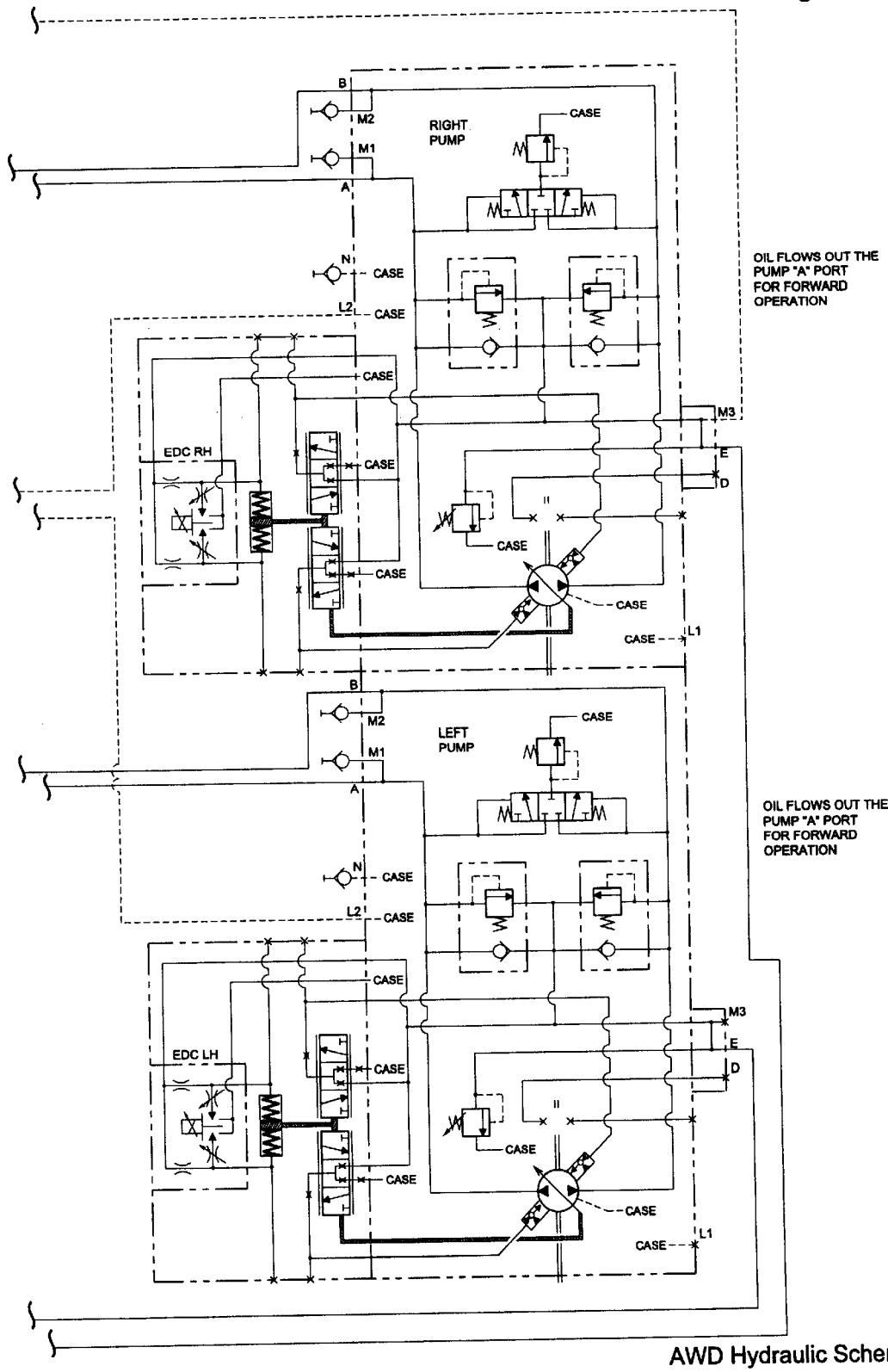
Figure 10:
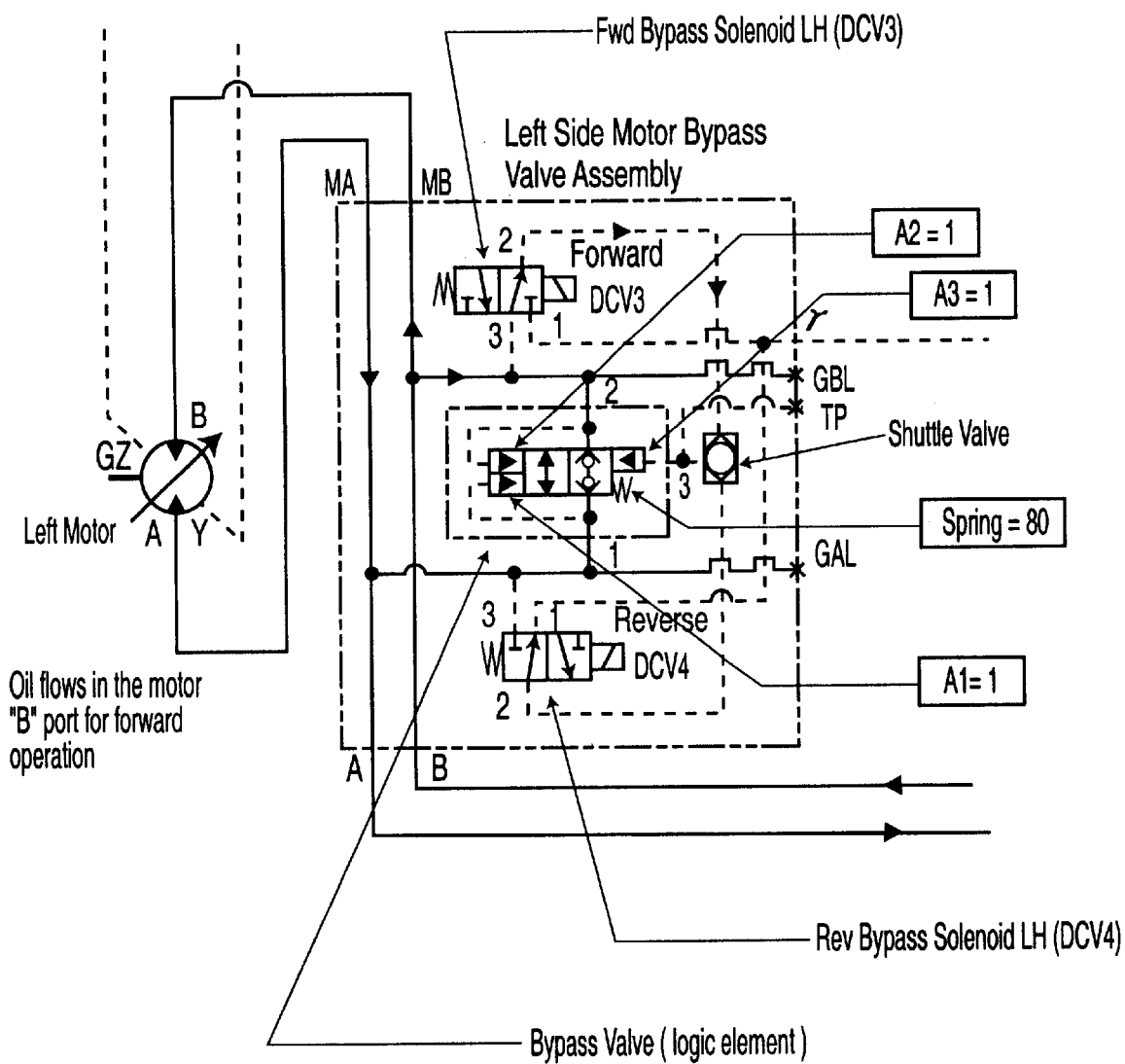

The detailed hydraulic circuit of FIG. 9 illustrates various controls of the front wheel drive systems. On the right hand side of the drawing, a right pump 4A and a left pump 4B are shown. Right pump 4A is connected to a right side free wheeling valve 31A and a left free wheeling valve 31B is connected to left pump 4B. These valves cause each of the respective motors 8A and 8B to operate in the free wheeling position as shown in FIG. 7. Each circuit also has the bypass valve 6A and 6B respectively. The circuits include a common charged pump which provides a minimum pressure to the systems.

The automatic condition sensing by-pass valves 6 can be better understood from a review of FIGS. 10 through 14. Each by-pass assembly consists of two solenoid operated two position three-way valves, one pilot operated logic element and one shuttle valve. The logic element (bypass) shifts to either the open or close position depending upon pressure acting on three differential areas. The solenoids are controlled to determine whether the device operates in a forward or reverse direction. In addition, DCV3 and DVC4 will be de-energized when a clutch or brake is actuated and/or when the all-wheel drive on/off switch is in the on position and the grader is in neutral or in 8th gear. The 8th gear is the highest gear and the all wheel drive is not in use in this position. Similarly, when the grader is in neutral this system is off. The bypass valve is open in 8th gear but the pump and motor are operating should a shift to 7th gear be made. The operating parameters of 8th gear cause the valve to open.

Activating the brake or clutch stops the direct drive of the front wheels. When oil flows in the motor through the B port, this defines the forward operation whereas when oil is provided through the A port, this defines the reverse operation. Basically, the forward bypass solenoid and the reverse bypass solenoid are set by the operator and similarly the input regarding the brake and clutch merely de-activate the system. The bypass valve generally forms the hydraulic equivalent of a sensitive over running clutch in function.

In a passive mode, the bypass valve receives input from the motor causing a hydraulic pressure which is higher than the pressure being provided by the pump. The bypass valve operates to bypass fluid either side of the motor and the wheels can merely react to the drive of the tandem drive without damaging the motor. In contrast, when the tandem drive starts to slip the front wheels are no longer over driven causing a reduction in pressure, causing the pump pressure to be higher and the bypass valve automatically closes and the pump drives the front wheels. This is accomplished automatically and quickly.

Figure 11:
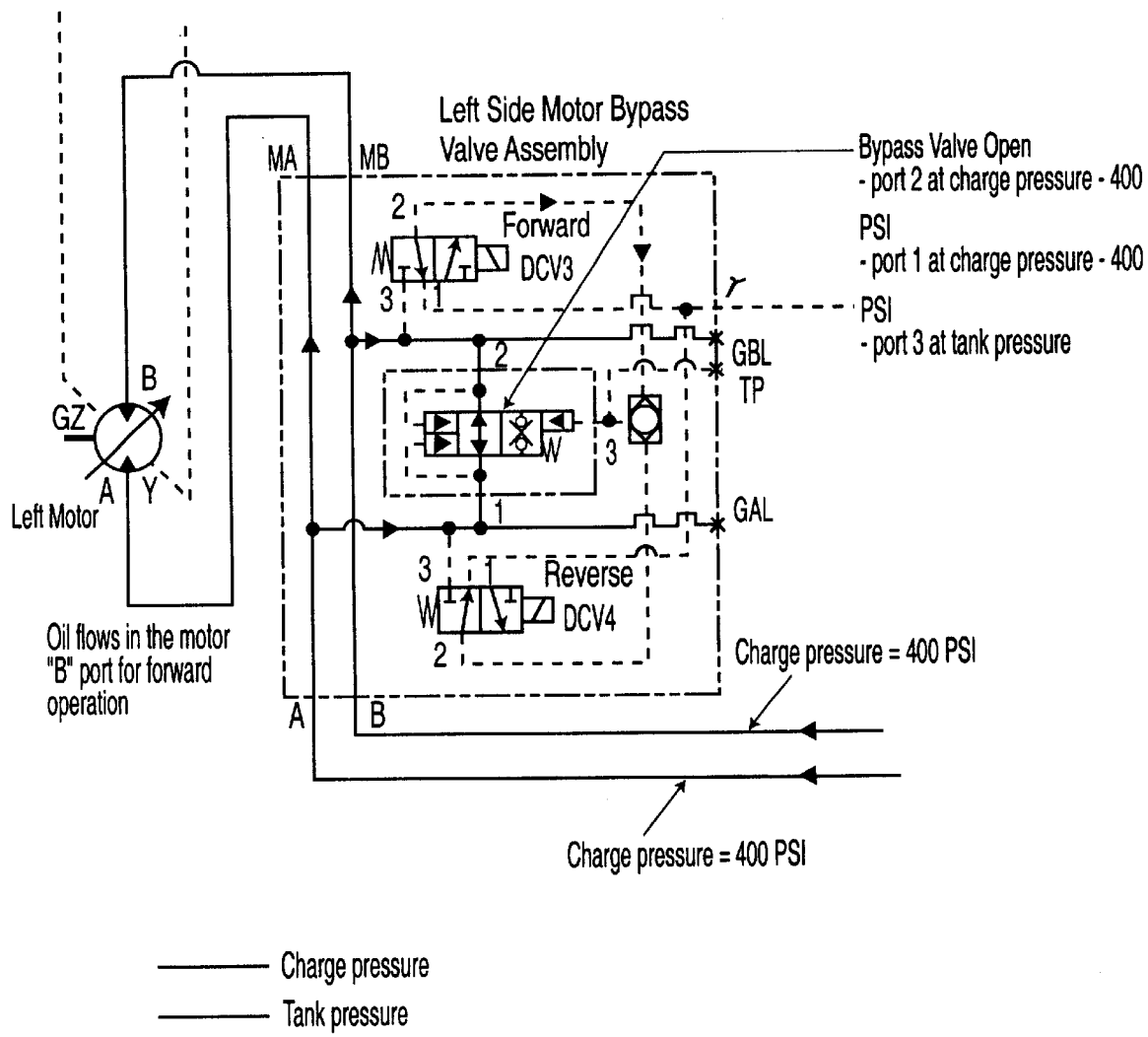

FIG. 11 shows the bypass valve where the all-wheel drive is switched on and a grader is in neutral. The bypass valve is shifted to a bypass position due to the fact the grader is in neutral and the pump pressure is low.

Figure 12:
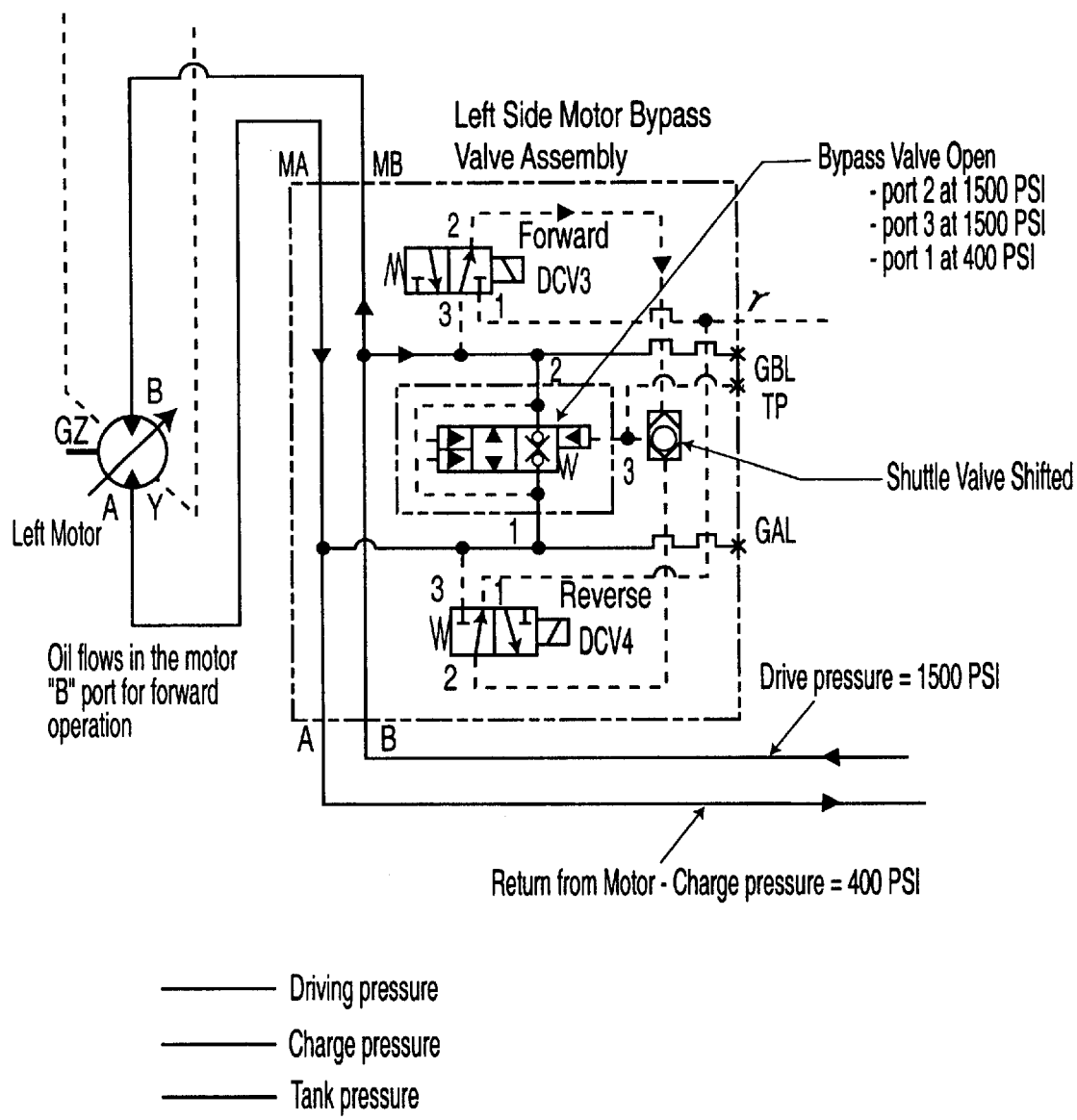

FIG. 12 shows the all-wheel drive on with the grader moving forward. The bypass valve is closed and oil flow is directed to the motor.

Figure 13:
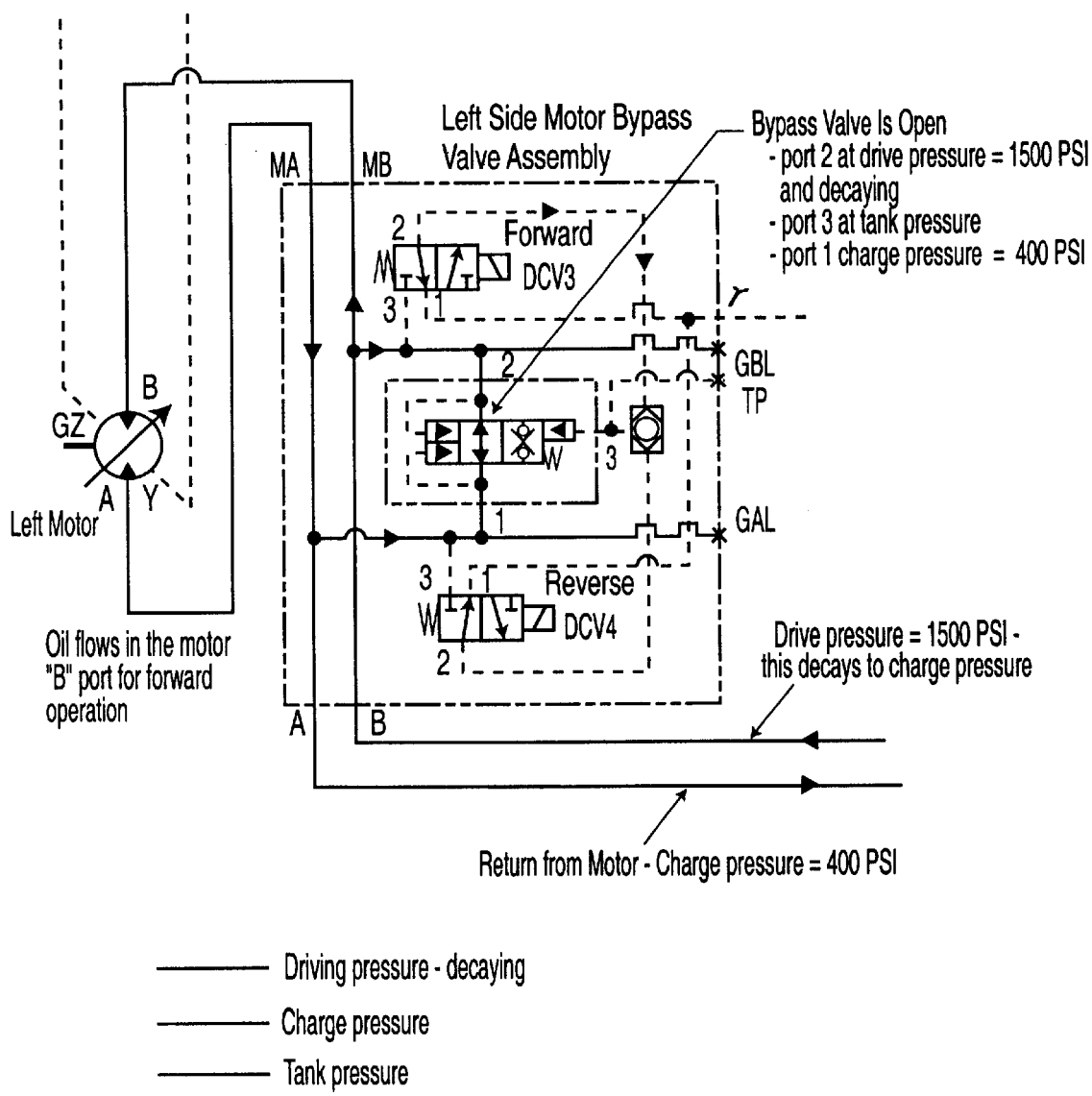

FIG. 13 shows the position of a valve when the operator actuates the clutch or brake. This results in the bypass valve being shifted to the open circuit condition.

FIG. 14 illustrates the position of the bypass valve when the operator makes a right turn. In such a case, the left wheel is driven faster by the grader and the full rate of oil supplied by the pump does not increase as the wheel speed increases. Drive pressure drops off eventually to the charged pressure. Oil flow returning from the motor increases as motor speed increases and this increase in braking pressure causes the bypass valve to open once the braking pressure is higher than the bypass valve spring pressure. This allows the left wheel to assume the correct speed as the output of the motor is connected to the motor input and then provides the necessary additional fluid and avoids cavitation. The pistons remain in contact with the cam and are ready when the condition is removed.

Figure 15:
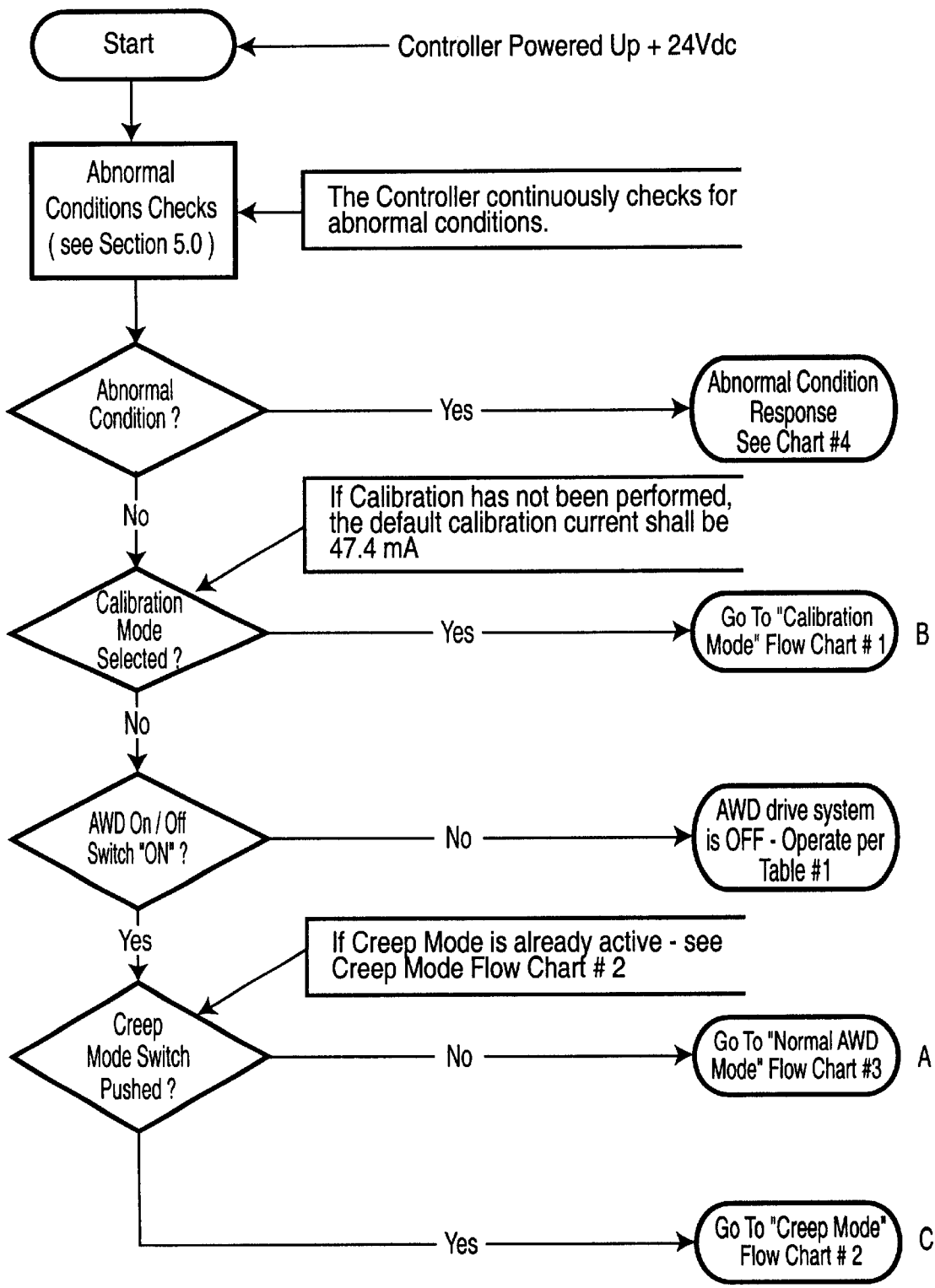
FIG. 15 shows the overall all wheel drive logic flow chart.

FIG. 15 shows the overall all-wheel drive logic flow chart. In this case when the controller is powered up, it looks to see whether there are abnormal conditions and also checks whether calibration has been performed or should be performed. It then checks to see whether the all-wheel drive is on or off and further checks whether it has been placed in creep mode. In creep mode, the tandem drive is disconnected and the grader is driven merely by the front wheels. The maximum creep mode speed is less than 3 m.p.h. and preferably 2 m.p.h. or less.

Figure 16:
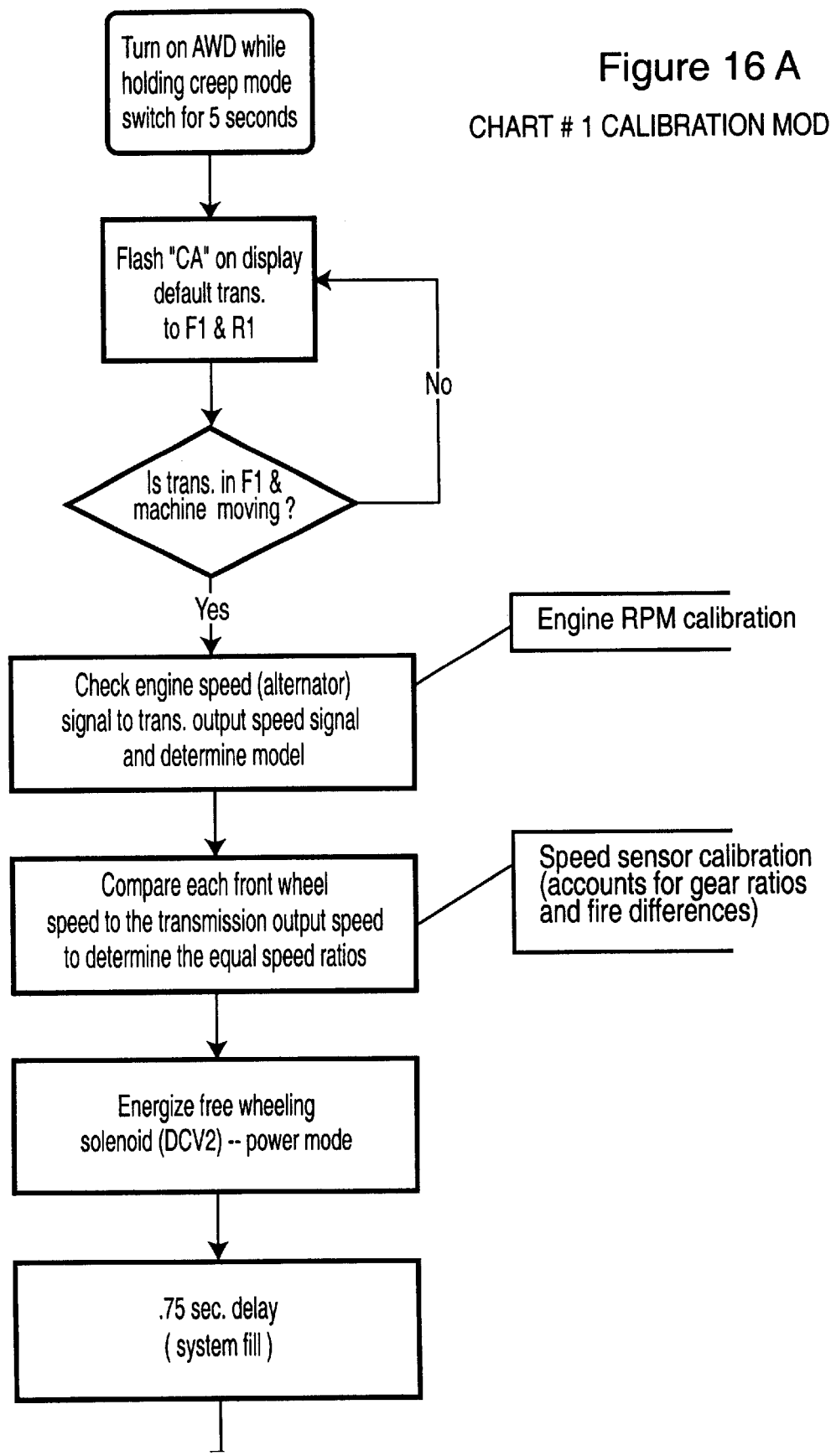
FIG. 16 shows the logic associated with the calibration mode of the system.
Figure 16:
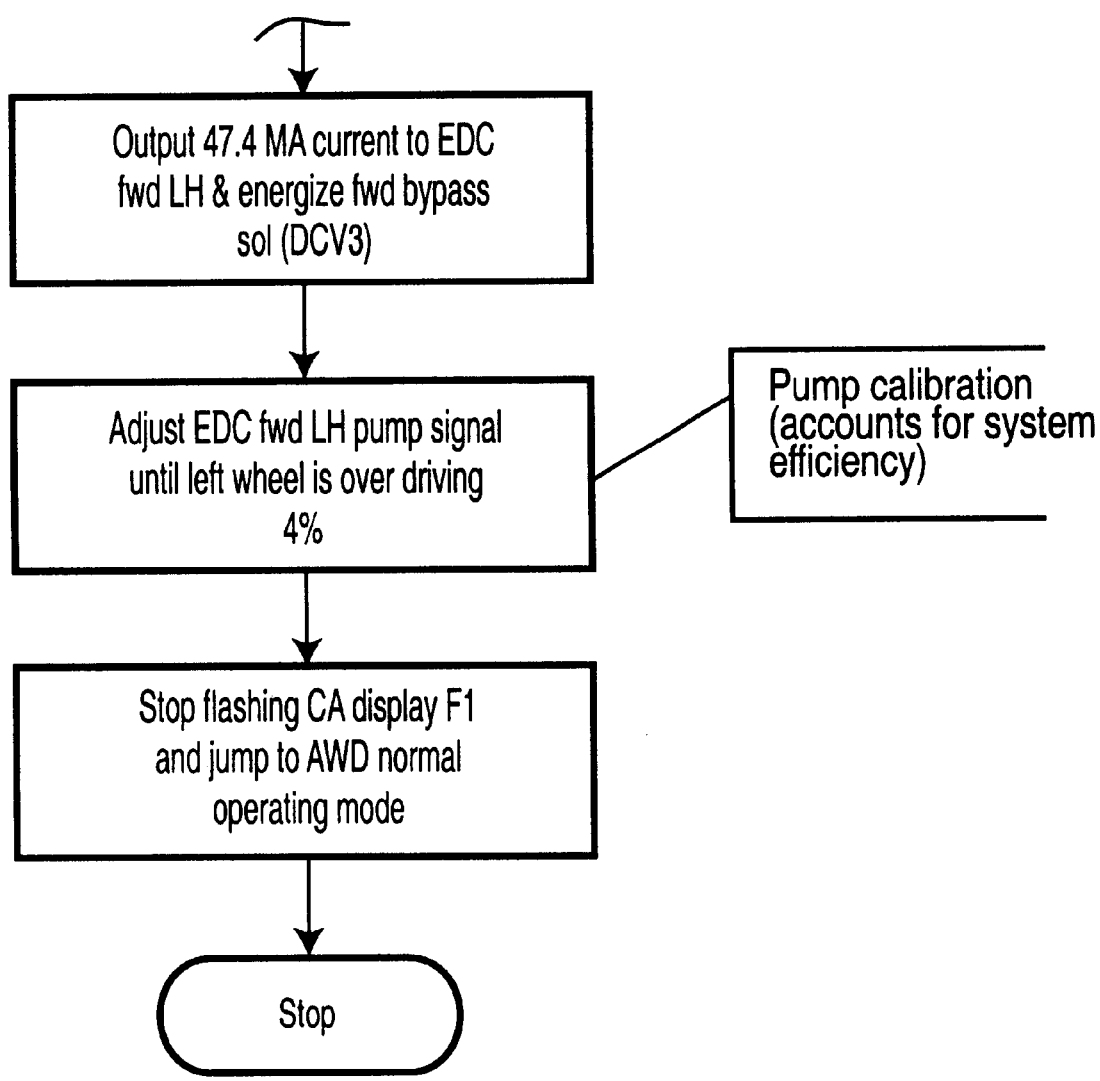
Figure 17A:
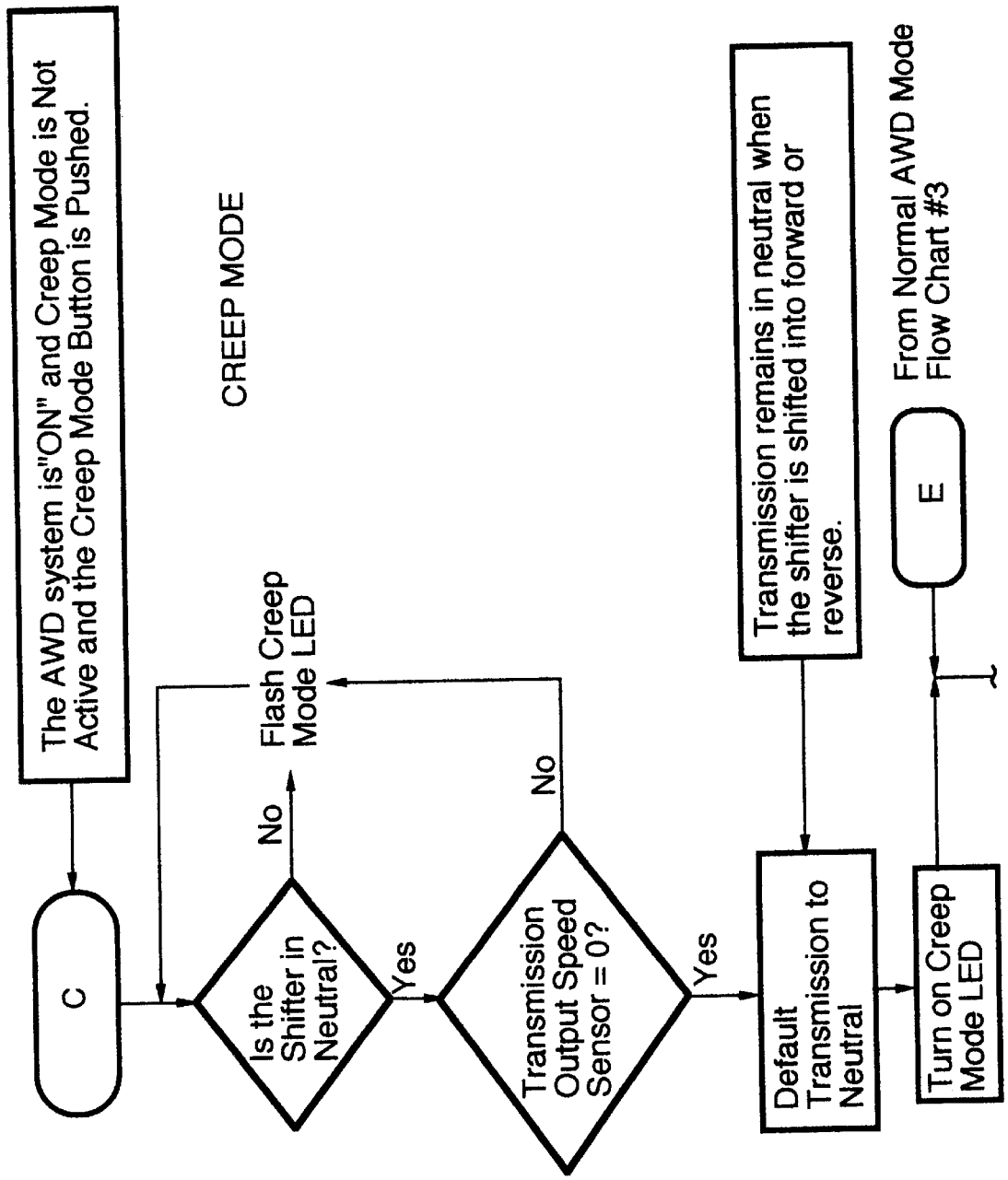
FIG. 17 is the control logic associated with the creep mode.
Figure 17B:
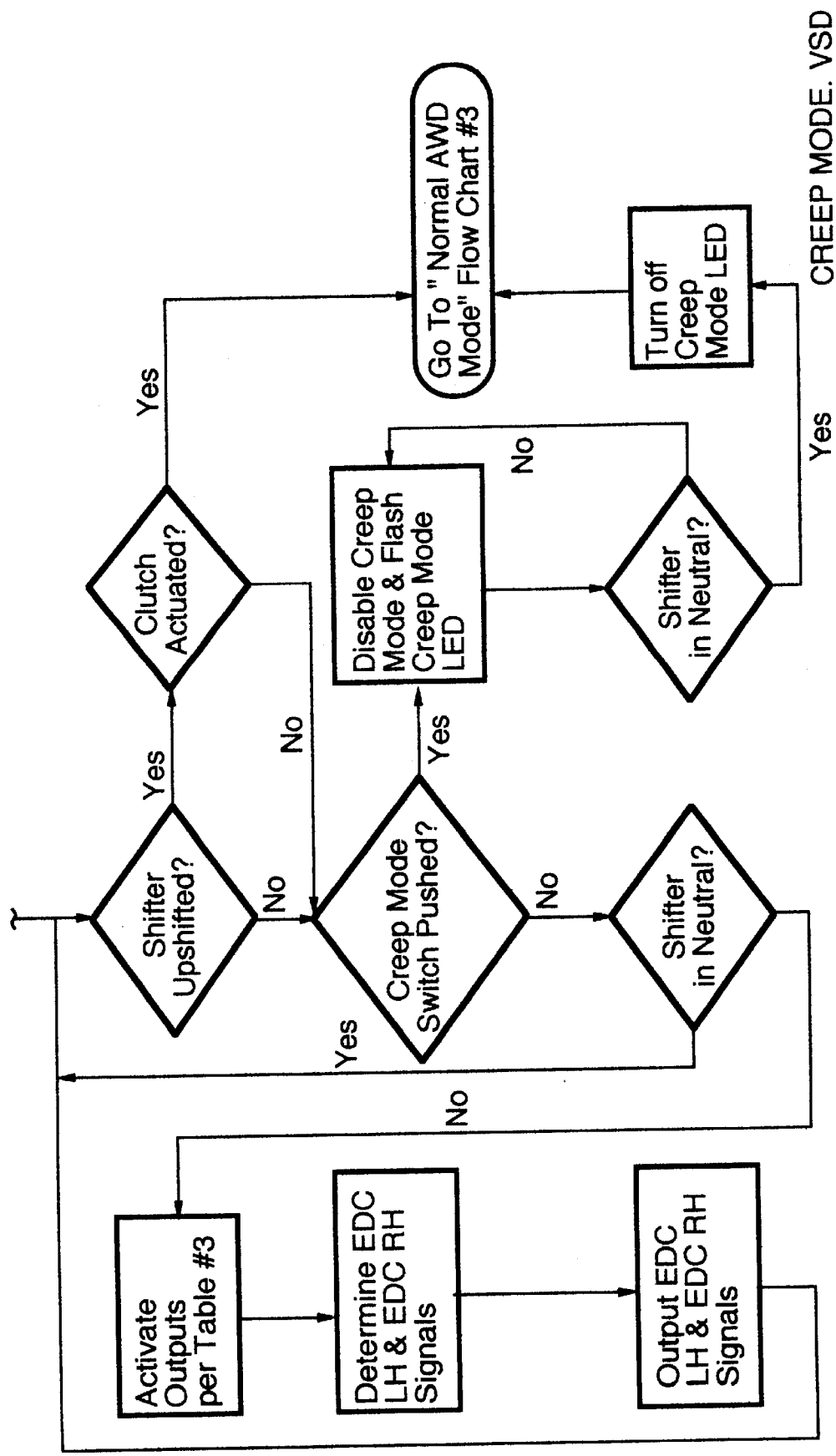
Figure 18A:
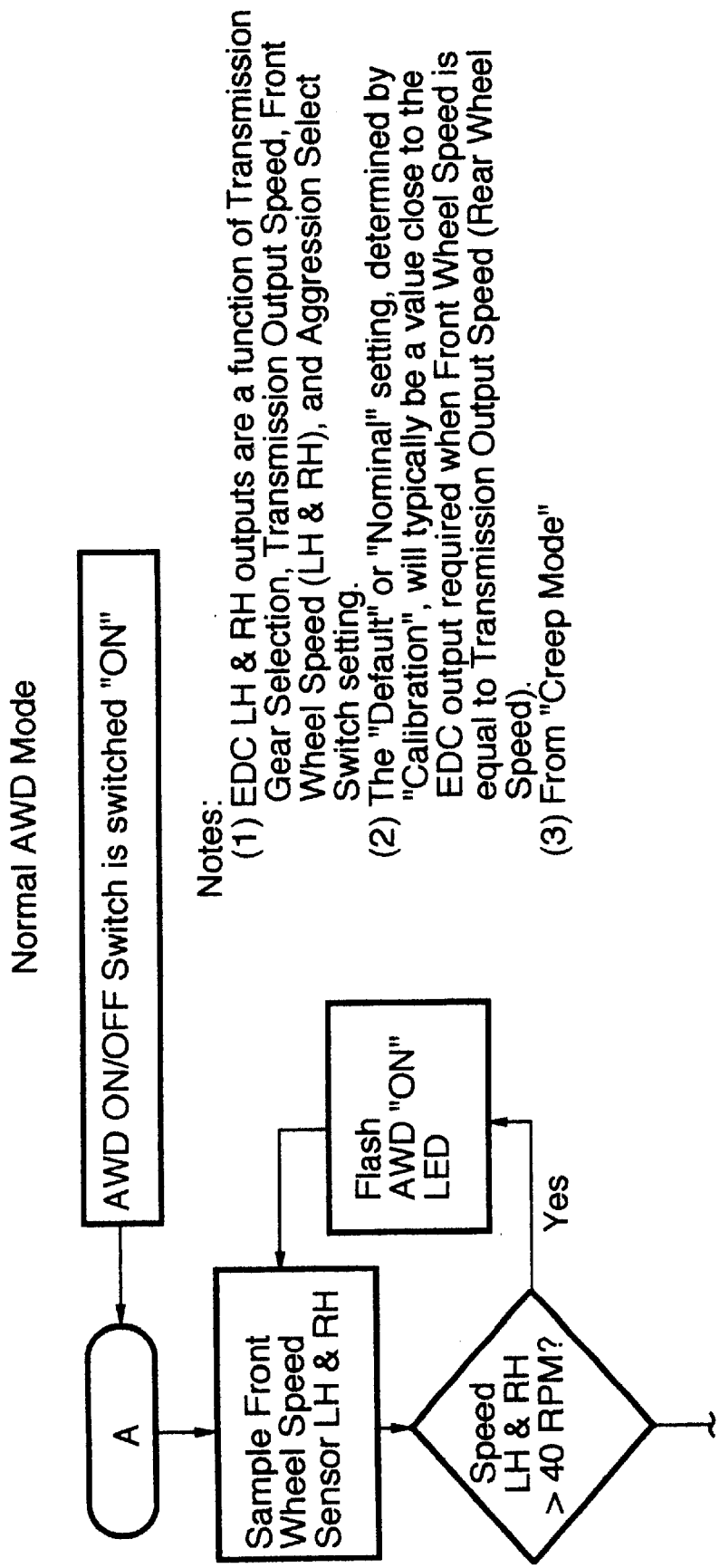
FIG. 18 is the control logic associated with the normal all wheel drive mode.
Figure 18B:
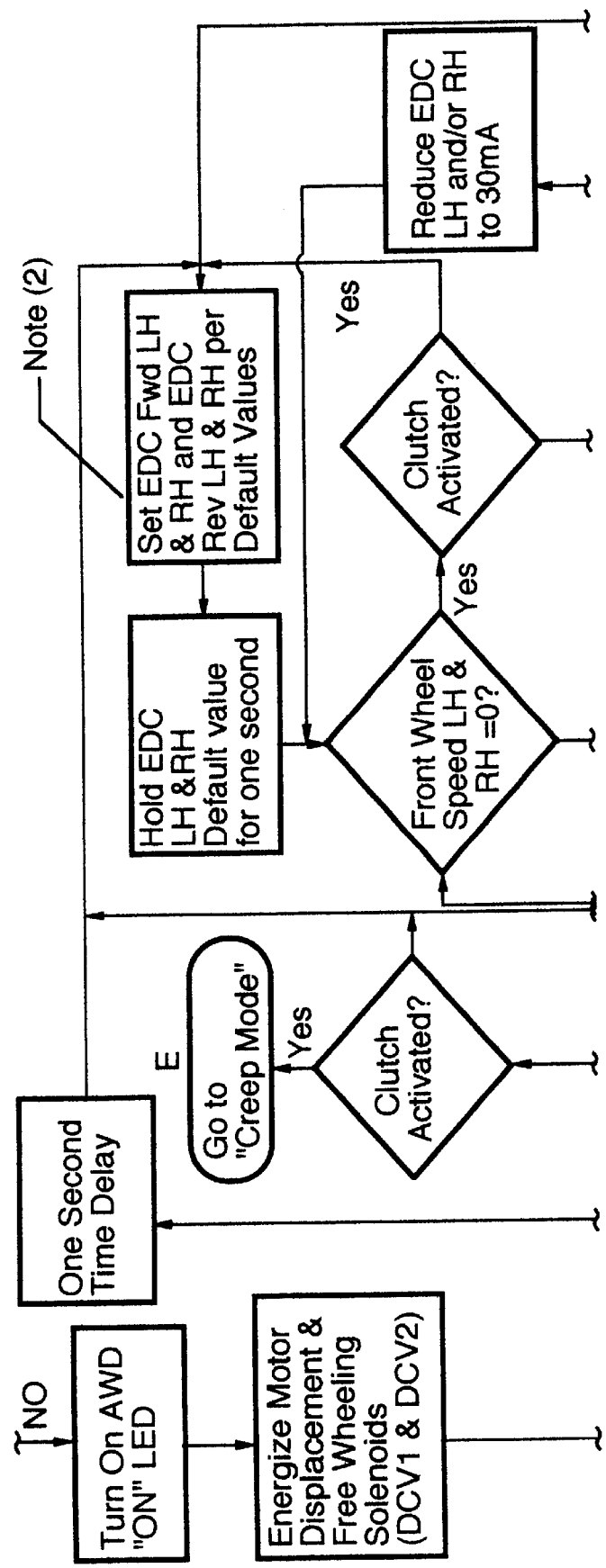
Figure 18C:
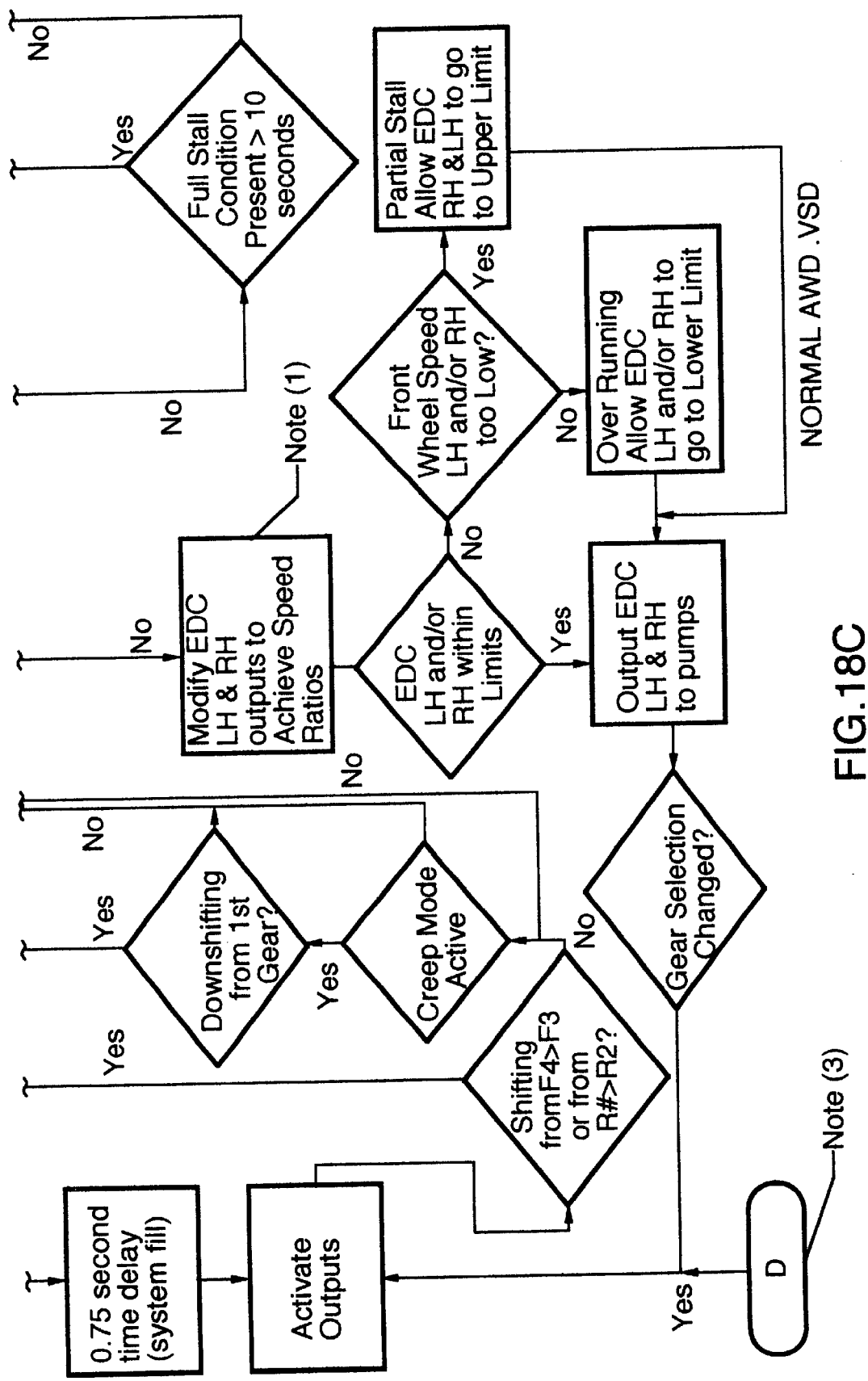

FIG. 16 shows detail of the logic associated with the calibration mode. FIG. 18 shows control logic associated with the creep mode of operation and FIG. 19 shows detail associated with normal all-wheel drive mode.

In the creep mode, the current provided to the hydraulic pump of each drive system 2 is a function of the engine RPM. Creep mode is used for very fine finishing grading. With such grading it is desirable to disconnect the tandem drive to avoid any scuffing or damage caused by turning. A large engine RPM range is used to allow the operator fine control with respect to the particular creep speed.

FIGS. 19 through 22 are similar to FIGS. 10 through 14 but provide additional details regarding the automatic response of the bypass valve.

Figure 19:
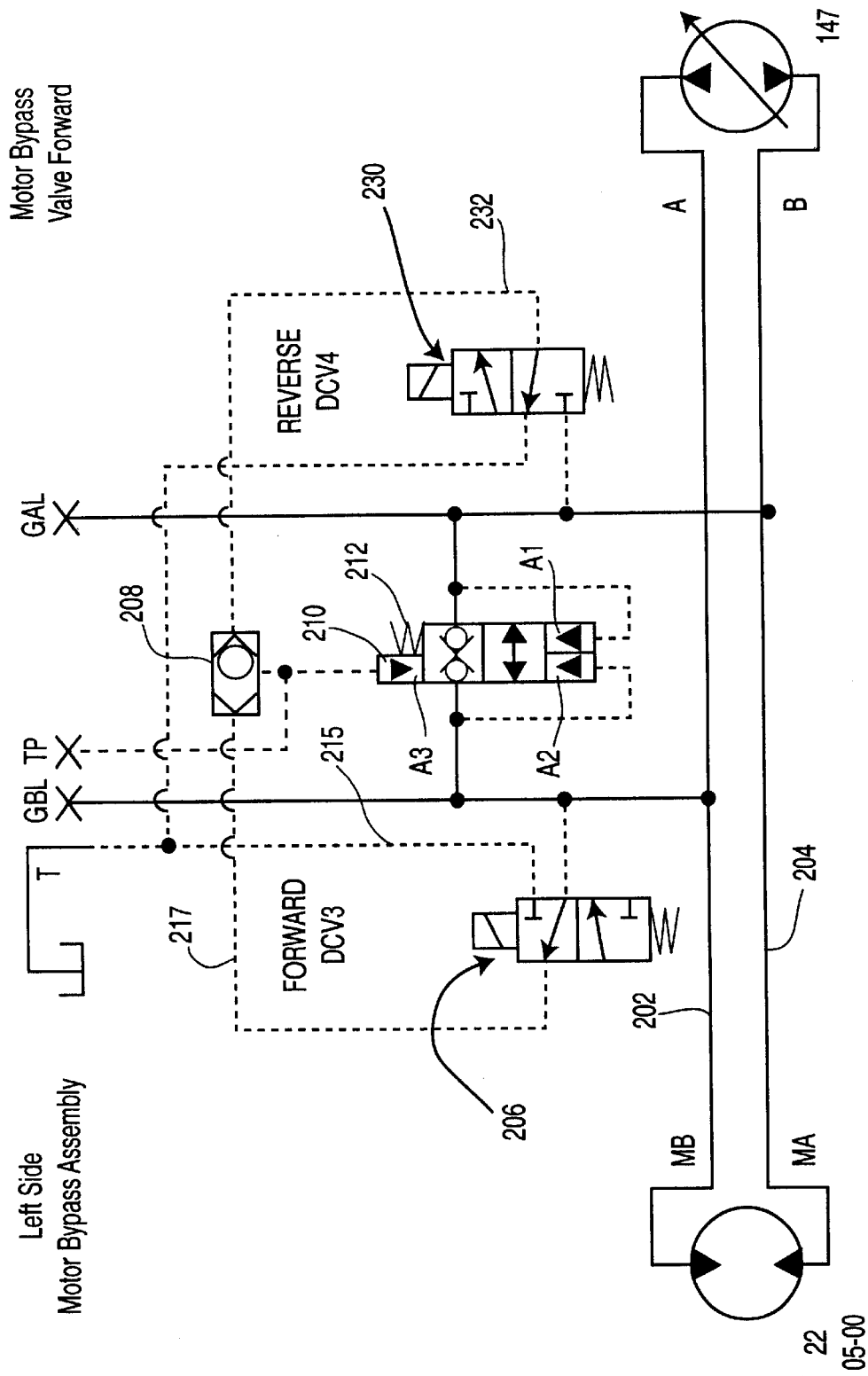
FIGS. 19 through 22 show the bypass valve and solenoid valve in various conditions.
Figure 20:
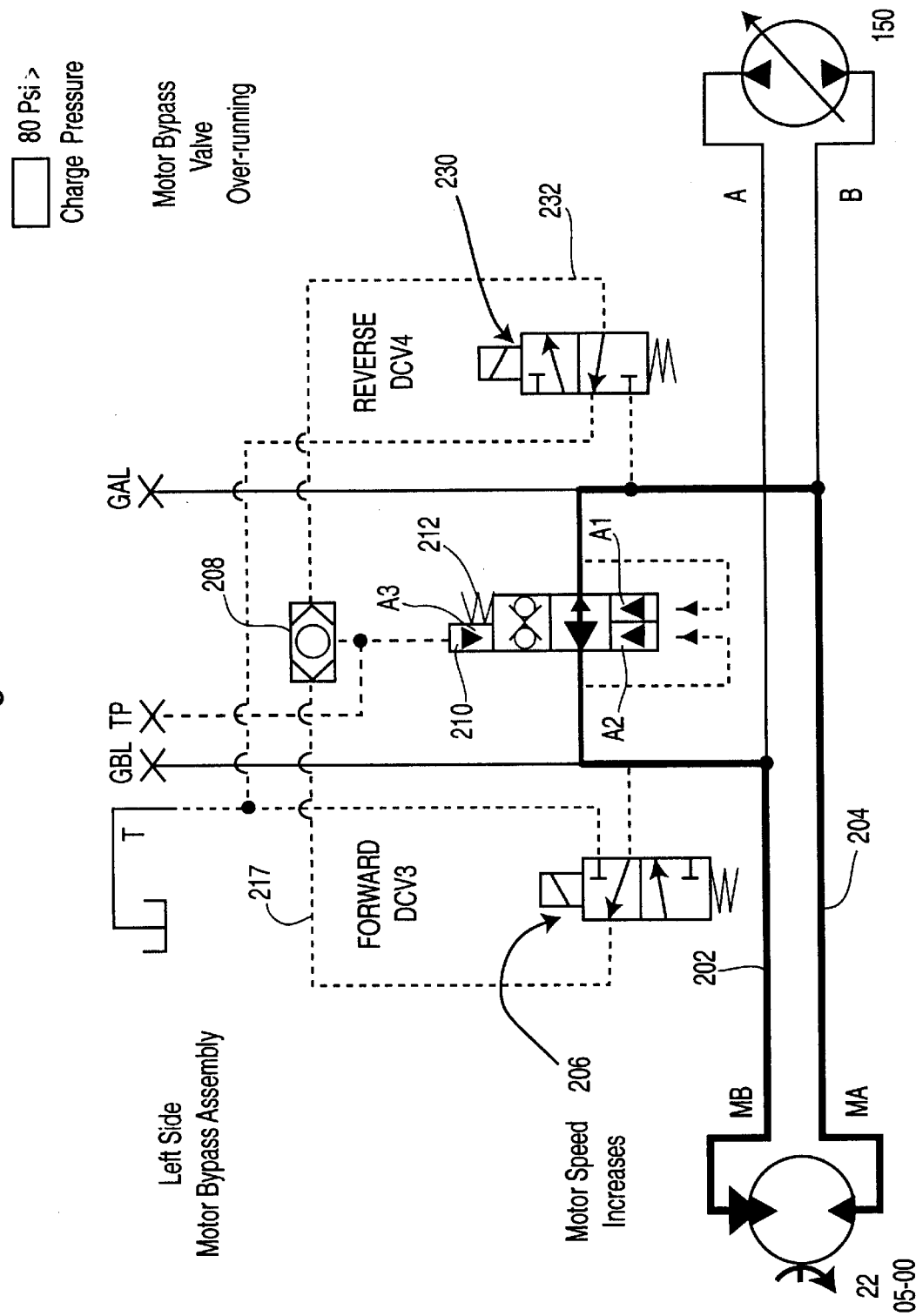

FIG. 19 is a schematic showing the position of the bypass valve and the forward solenoid valve and the reverse solenoid valve when the drive arrangement is in all wheel drive forward mode. The drive pressure from the pump is provided to the motor along line 202 and the charge pressure on the low side of the motor is returned on line 204. There is a large pressure differential the high side and the low side across the motor. As shown in the Figure, the forward solenoid valve 206 is activated and therefore the high pressure is provided through the solenoid valve 206 to the shuttle valve 208 and to the bypass valve at 210. This high pressure acts on a large area of the logic valve which is twice the size of the individual areas on the opposite side of the logic valve.

The opposite side of the logic valve has a first area a1 which is exposed to the charge pressure and a second area A2 which, in this case, is exposed to the high drive pressure. The high pressure is also operating on the opposite end of the logic valve on an area A3 where A3 is twice the size of A1 or A2, and a1 equals A2. A spring 212 exerts a force equivalent to 80 psi. In the forward position as shown, the high pressure acting in area A3 in combination with the spring 212 produces a force which overwhelms the force exerted on A2 and A1. As can be appreciated A1 is only acted upon by the lower charge pressure, and as such, the force created on area 3 moves the bypass valve to the closed condition. Each of the check valves are closed.

In this forward condition, the motor is functioning to provide power and the operator has not actuated the clutch or the brake. If the operator actuates the clutch or the brake, a problem would occur as he would anticipate braking, however, the motor would continue to drive the front wheels as there has been no change to the output of the pump. To address this situation, a signal corresponding to a brake signal or a clutch action of the operator causes the forward solenoid valve 206 to be de-energized. In this case, the solenoid valve moves rapidly upwardly and connects line 215 associated with the tank, with line 217 associated with the shuttle valve and thus brings area A3 under the pressure of the tank which is essentially at zero pressure. Under these conditions, the force exerted on areas A2 and A1 vastly overpower the spring pressure and the pressure on A3 and the bypass valve moves rapidly to the bypass condition. In this way, the hydraulic fluid from the pump can pass the motor and the front wheels are then allowed to free wheel such that normal braking or clutching occurs. A further benefit is that the pump for powering of the motor remains stroked and as soon as the clutching or braking condition is removed, the solenoid valve is activated returning the circuit to the condition of FIG. 19 and power is returned to the motor.

From the above, it can be seen that the activation of the solenoid or the deactivation of the solenoid valve rapidly causes the bypass valve to move from a closed position of FIG. 19 to a bypass position and thus controls the motor hydraulically acting much in the manner of a mechanical clutch to the wheel during braking or clutching or an overdrive condition.

FIG. 11 shows an arrangement where the all wheel drive switch is on and then grader is in neutral. In this case, the forward solenoid valve is de-energized much as it would be during clutching or braking, and as such, the bypass valve has assumed the bypass condition. Therefore, the forward solenoid valve is controlled in accordance with a braking signal, clutching signal or a neutral signal to force the bypass valve to the bypass condition hydraulically.

During normal operation of the all wheel drive, there are several conditions which can result in a overrunning of the front wheel drive motors. Such an overrunning condition can occur during cornering of the motor grader as the outside wheel will be overdriven and can occur during passive operation of the front wheel drive. In the passive mode, the hydraulic motor is driving the front wheel, however, it is not driving at sufficient speed to match the speed caused by the tandem drive. In such a condition, the motor is being overdriven and the discharge from the hydraulic motor is actually higher than the inlet pressure of the motor. Such an overdrive condition is shown in FIG. 14 and in FIG. 20.

As can be appreciated, due to the position of the forward solenoid valve, area A3 is still exposed to the inlet pressure to the motor. Similarly, area A2 is exposed to the inlet pressure to the motor. Area A1 is now exposed to the higher outlet pressure from the motor, thus the pressure acting on A1 has changed from a low value to a high value, due to the motor being effectively overdriven, and the motor functioning as a pump. This change in hydraulic conditions causes the bypass valve to move rapidly to the bypass condition as clearly shown in FIG. 20. Such a overrunning condition occurs whenever the motor is effectively overdriven. This can occur during cornering and is the general condition when the all wheel drive is on, and it is working in passive mode. The passive mode implies that the motor is being under driven by the pump associated therewith and it will only effectively kick in if there is slippage of the tandem drive.

The variable pump associated with the motor is adjusted in accordance with the speed of the grader and in a passive mode, under drives the motor. However, when slippage occurs, the forward drive becomes active as the front wheels are no longer being overdriven by the tandem drive which is slipping. As such, the passive mode causes the hydraulic motor to act as a motor. The motor is no longer overdriven due to the tandem drive slipping and the change in hydraulic conditions causes the bypass valve to close and the front wheel drive provides positive drive. Once the slippage condition of the tandem drive is removed, the system returns to its passive mode (bypass valve open). As it can be appreciated, the sensed hydraulic conditions cause the rapid movement of the bypass valve from a bypass condition, to a non bypass position. The bypass valve automatically responds to the changes in hydraulic pressure and rapidly moves to appropriately assume the bypass or the closed mode.

It is also possible to run the hydraulic motor in an aggressive mode merely by increasing the output of the pump which supplies the hydraulic fluid to the motor. In the aggressive mode, the hydraulic motor is acting as a motor, and as such, the motor bypass valve is closed. It should be noted that if an overrunning condition occurs due to cornering, for example, the bypass valve senses the changes in hydraulic conditions and automatically assumes a bypass mode.

Figure 21:
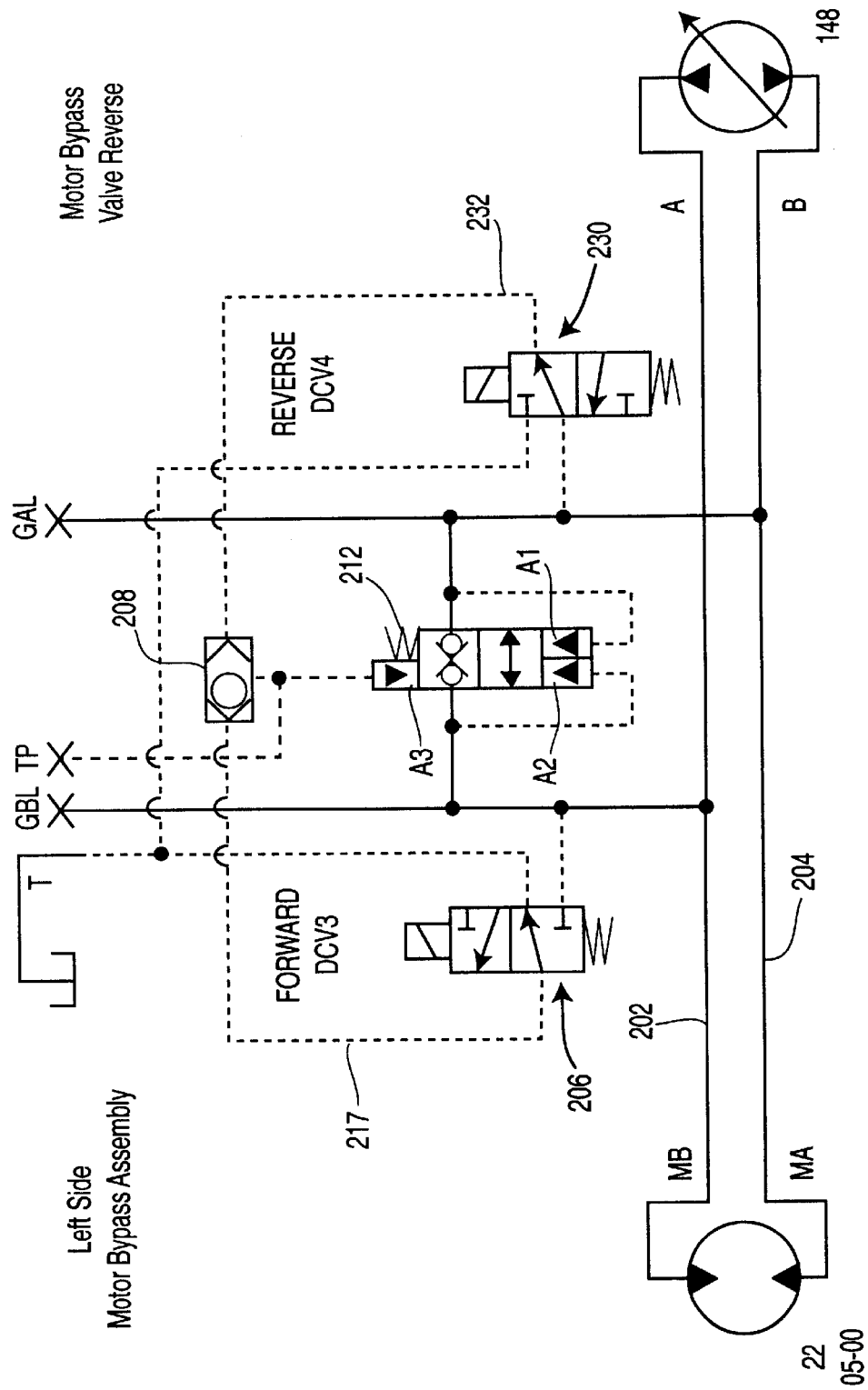

FIG. 21 shows the position of the valves when the all wheel drive is in a reverse drive mode. In this case, the high pressure hydraulic fluid is provided to the motor along line 204 and line 202 is at the charge pressure. The forward solenoid valve 206 has been deactivated, and thus the pressure exerted on the shuttle valve 208 is low, i.e., the tank pressure. In contrast, the reverse solenoid 230 has been activated and now connects the high pressure line 204 through the solenoid valve to line 232 to the shuttle valve 208 and thus provides high pressure to area A3. Area A1 is also exposed to this high pressure. In contrast, area A2 is now exposed to the discharge pressure of line 202. As can be appreciated, the forward and reverse solenoid valves have basically reversed and areas A1 and A2 have been reversed. A3 is still exposed to the high pressure from the pump. The bypass valve will operate in the identical manner as previously described to sense an overrunning condition and the reverse solenoid valve 230 can be deactivated in the case of a clutch or braking action, or if the grader is in neutral.

The pump is controlled as a function of the gear selection. When the AWD is on and the grader is in neutral, the pump will be at zero displacement. The pump is connected to the motor via the freewheeling valve.

When the machine is shifted into gear, a current signal is immediately sent to the pump that causes the pump to go to a nominal displacement appropriate for the gear selected. The nominal displacement is approximately equal to the displacement required to drive the front wheels at the same speed as the rear wheels.

The control system then monitors the speed signals from the front wheels, the output speed of the transmission (rear wheel speed) and the aggression switch. The current supplied to the pump is adjusted accordingly to drive the front wheels at the appropriate speed.

When the clutch and/or brake are actuated and the bypass valve opens to allows oil to bypass the motor, the pump remains stroked (supplies oil to the motors) and speed sensing is still operating.

When the clutch and/or brake are released and the bypass valve closes, the pump is at the correct displacement for good positive responsive front wheel drive.

When a new gear is selected, a new nominal pump displacement is selected appropriate for the gear.

The system as described uses a hydraulic circuit to sense overrunning conditions during passive mode and during cornering and opens the bypass valve to protect the motor and improve handling. A solenoid valve is used to alter the hydraulic pressures to the bypass valve and causes the bypass valve to assume the bypass condition during braking or clutching, as well as accommodating a neutral condition. The all wheel drive is controlled by a variable displacement pump and the output of the pump can continue its normal operation during braking or clutching. Similarly, the pump does not have to and does not respond to conditions which would result in overrunning of the motor. This greatly simplifies the control of the pump and allows extreme flexibility in setting of the pump as these conditions or the hydraulic conditions of the motor are protected by the bypass valve/solenoid combination.

The system is not prone to damage and conditions which could produce cavitation of the hydraulic motor are corrected by the bypass valve automatically moving to the bypass position. Preferably, the pump and motor act together as part of a drive for one front wheel alone. It can be appreciated that the bypass valve solenoid combination essentially protects the hydraulic motor used to drive the front wheel and any suitable combination for providing hydraulic fluid for driving of the motor will be acceptable. A separate pump for each drive wheel simplifies control of the pump output.

When the system is used in a motor grader, each of the front wheels acts independently of the other. A speed sensor can be associated with each front wheel and a controller can use the particular gear and engine speed to set the output of the variable displacement pump associated with the particular motor. This controller can adjust the variable displacement pump either up and down, to bring the sensed wheel speed into agreement with a predetermined speed based on the gear and engine speed and level of aggression set by the operator. In this way, each system acts independently and adjust itself to the correct speed.

The system is also capable of changing on the fly from a passive mode to an aggressive mode and a host of settings in between. Basically, the operator sets a particular level of passive or aggressive mode, and each of the variable displacement pumps adjust to produce the correct speed condition. The system also relies on the bypass valve such that the pump output will not drop below a certain minimum level and cannot go beyond a certain maximum level. In this way, power is quickly transferred to the front wheels as the pumps are in an operating condition and the bypass valve is normally bypassing until it is required. This will be the case where the system is in the passive mode and the tandem drive starts to slip. The front wheel drive becomes active due to the ground speed decreasing and the bypass valve closing.

Figure 22:
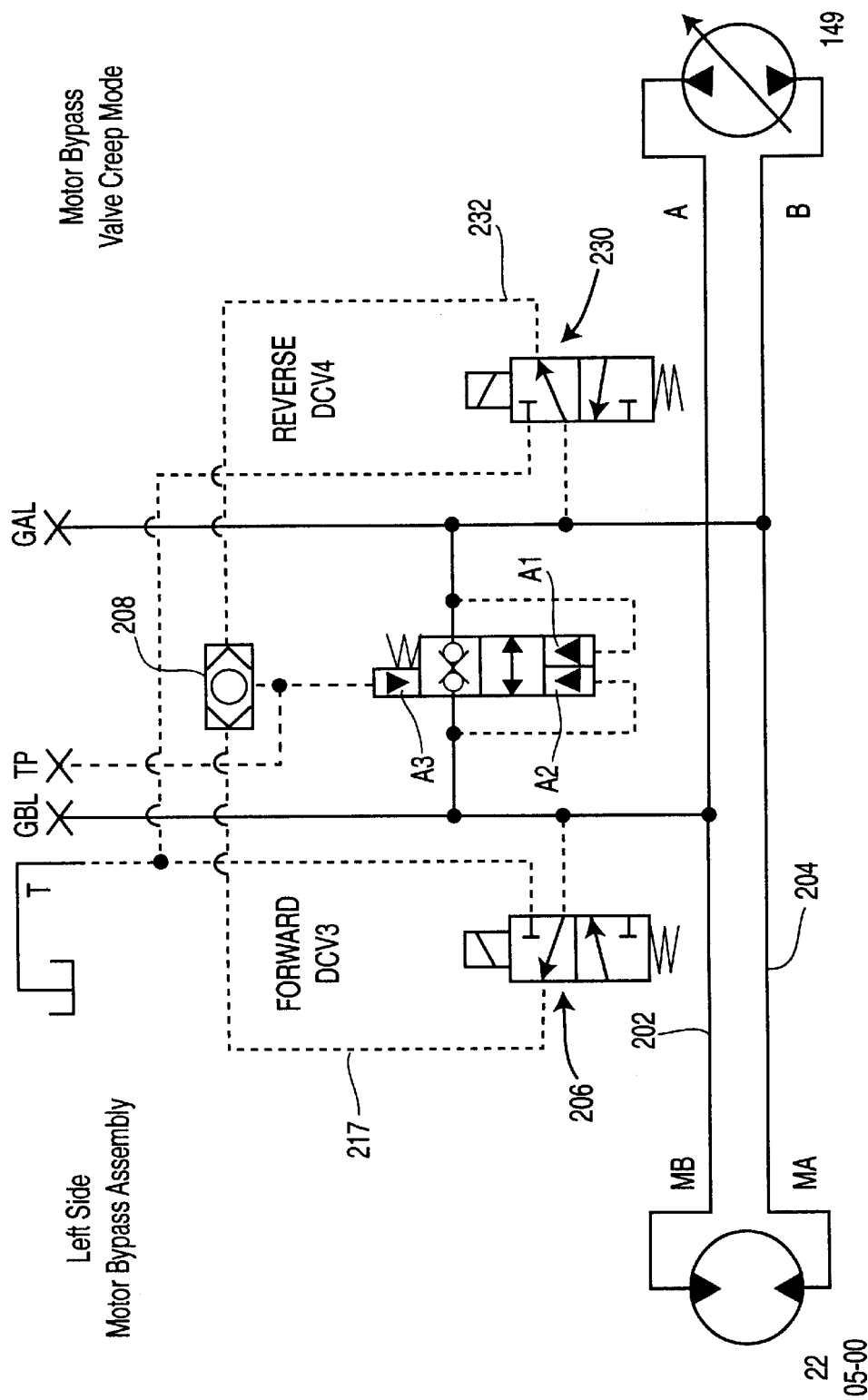

FIG. 22 shows the various valves when the all wheel drive is in creep mode. In this position, the bypass valve does not work and front wheel drive is provided as well as front wheel hydraulic braking until the brake is activated. As shown, the forward solenoid valve 206 is activated and as such, drive pressure is provided as area A3. Area A2 is also subject to the drive pressure. Area A1 is subject to the charge pressure, and as such, the bypass valve is in the closed position.

In creep mode, both the forward and reverse solenoid operated valves are energized (or shifted). Engine speed and current supplied to pump are controlled with throttle pedal.

The bypass valve is forced to stay in the closed position (except when the clutch and/or brake are actuated) at all times. The motors cannot be in an "overrunning" condition as overrunning has been discussed in this application.

Moving forward on a level grade or uphill.

Area A2 (motor in) will see drive pressure (assume 1000 PSI)

Area A3 (motor in) will see drive pressure (assume 1000 PSI)

Area A1 (motor out) will see charge pressure (400 PSI)

Moving forward downhill.

Area A2 (motor in) will see charge pressure.

Area A3 (now motor out) will see brake pressure (assume 1000 PSI)

Area A1 (motor out) will see brake pressure (assume 1000 PSI)

Both solenoid-operated valves are shifted and either motor inlet or outlet pressure can be directed to Area A3. The high pressure will win.

While turning, front wheel speed is not being controlled and matched to rear wheel speed and pump flow is such that the motors will not run out of oil. In the worst case, during a very sharp turn, the operating pressure may decrease at the outside wheel and increase at the inside wheel.

In creep mode, a true closed loop, hydrostatic drive with hydrostatic braking, is provided unless the brake or clutch is engaged.

The present all-wheel drive arrangement has recognized that there are significant control logic advantages to having separate drive systems for each front wheel of the grader. The actual hydraulic flow to each hydraulic motor can be more precisely controlled by varying the output of the particular pump. In addition the condition sensing bypass valve allows rapid opening and closing or switching of the hydraulic circuit between an opened and a closed configuration. This allows the drive wheels to assume an active mode when they are in a passive condition and slippage of the tandem drive occurs. The automatic bypass valve simplifies the control logic. Electric control arrangements which operate valves are not as fast and the sophistication of the control logic is significantly greater particular in the light of many different modes and speeds in which the system operates.

Although various preferred embodiments of the present invention have been described herein in detail, it will be appreciated by those skilled in the art, that variations may be made thereto without departing from the spirit of the invention or the scope of the appended claims.

The embodiment of the invention in which an exclusive property or privilege is claimed are defined as follows:

1. A front wheel drive for a motor grader comprising an hydraulic motor connected to a front wheel of a motor grader, a source for providing high pressure hydraulic fluid to said hydraulic motor, an hydraulic bypass circuit in parallel with said hydraulic motor controlled to be opened or closed by a bypass valve, said bypass valve being a hydraulic logic element which is responsive to hydraulic motor conditions either side of said motor, said bypass valve being normally closed when said hydraulic motor conditions cause said hydraulic motor to drive said front wheel and said bypass valve assuming an open position when said hydraulic motor conditions change due to said front wheel overdriving said motor and wherein said bypass valve includes an electrically operated valve associated with said bypass valve, said electrically operated valve in one position allowing said bypass valve to respond to said hydraulic motor conditions and in a second position altering the hydraulic conditions sensed by said bypass valve and causing said bypass valve to move to an open position.

2. A front wheel drive as claimed in claim 1 wherein said electrically operated valve is responsive to an electrical signal caused by operator braking or clutching and said electrically operated valve moves to said second position when said electrical signal is present.

3. A front wheel drive as claimed in claim 1 wherein said source of high pressure hydraulic fluid is a variable output pump which continues to provide said high pressure hydraulic fluid during operator braking or clutching.

4. A front wheel drive as claimed in claim 3 including a sensor for producing a signal representative of the speed of the motor grader and wherein said variable output pump is adjusted to vary the output thereof as a function of said signal representative of the speed of the motor grader.

5. A front wheel drive as claimed in claim 3 wherein said drive includes selection means for selecting between an aggressive mode or a passive mode, said drive in said passive mode normally being overdriven by said front wheel with said bypass valve open, said drive in said passive mode automatically closing said bypass valve and thereby driving said front wheel when said front wheel does not overdrive said motor.

6. A front wheel drive as claimed in claim 5 including a sensor producing a speed signal representative of the speed of the motor grader wherein said variable output pump in said aggressive mode provides said hydraulic motor sufficient hydraulic fluid to overdrive said front wheel relative to said speed signal provided to said variable output pump.

7. A front wheel drive as claimed in claim 1 wherein said motor is a piston motor which is hydraulically adjustable to a free wheel position by movement of said pistons.

8. A drive arrangement for a motorgrader comprising a tandem drive for rear wheels of the grader in combination with independent front wheel drives for each front wheel; each front wheel drive comprising a variable output hydraulic pump powering an hydraulic motor which drives one of the front wheels of the vehicle, said hydraulic motor being connected to said hydraulic pump via a hydraulic circuit, said hydraulic circuit including a bypass circuit in parallel with said hydraulic motor controlled to be opened or closed by a bypass valve, said bypass valve being a hydraulic logic element which is responsive to hydraulic motor conditions either side of said motor, said bypass valve being normally closed when said hydraulic motor conditions cause said hydraulic motor to drive said front wheel and said bypass valve assuming an open position when said hydraulic motor conditions change due to said front wheel overdriving said motor, each pump including a controller for adjusting the output of the pump in accordance with an input signal; said drive arrangement being selectively operable in a passive mode where said front wheel drives are overdriven by said tandem drive or an aggressive mode where said front wheel drives tend to overdrive said tandem drive; each front wheel drive, when said drive arrangement is in a passive mode, being normally overdriven by said tandem drive and said bypass valve compensates by assuming said open position, and said bypass valve automatically assumes said closed position in the event of a slippage condition of said tandem drive resulting in the temporary stoppage of the overdrive condition of said front wheel drives and the active drive of each front wheel drive until the slippage condition ceases.

9. A drive arrangement for a motorgrader as claimed in claim 8 wherein said bypass valve of each front wheel drive automatically assumes said closed position based on changes in hydraulic fluid pressure of said hydraulic circuit.

10. A drive arrangement for a motorgrader as claimed in claim 9 wherein said arrangement includes an arrangement for setting different levels of passive and aggressive modes.

11. A drive arrangement for a motorgrader as claimed in claim 9 wherein said drive arrangement includes a creep mode where only said front wheel drives are operatives.

12. A drive arrangement for a motorgrader as claimed in claim 11 wherein said creep mode has a top speed of less than 3 miles per hour.

13. A drive arrangement for a motorgrader as claimed in claim 11 wherein said front wheel drives when turned off cause said motors to assume a free wheel condition.

14. A drive arrangement for a motorgrader as claimed in claim 8 wherein said drive arrangement includes an electrical controller which cooperates with a series of sensors to assess speed parameters of the drives of the grader and adjusts each input signal to each pump as a function of said sensed conditions.

15. A drive arrangement for a motorgrader as claimed in claim 14 wherein said controller receives operator instruction signals which determine a desired drive condition and said controller adjusts each input signal based on said desired drive condition and said assessed speed parameters.

16. A drive arrangement for a motorgrader as claimed in claim 15 wherein said assessed speed parameters include sensed front wheel speeds.

17. A drive arrangement for a motorgrader as claimed in claim 8 wherein said bypass valve of each front wheel drive senses actual hydraulic conditions of said circuit and responds thereto to move between said open and closed position.

18. A drive arrangement for a motorgrader as claimed in claim 8 wherein each front wheel drive includes its own input signal which determines the output of the respective pump.

19. A drive arrangement for a motorgrader as claimed in claim 18 wherein each bypass valve allows the motor to be overdriven without cavitation.

* * * * *